March 17, 1936.  F. O'NEILL  2,034,055
GLASS FEEDING MACHINE
Original Filed June 23, 1926   10 Sheets-Sheet 3
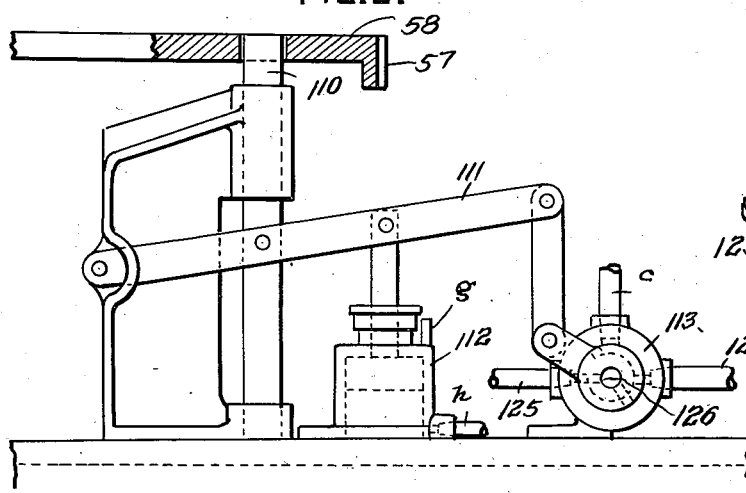
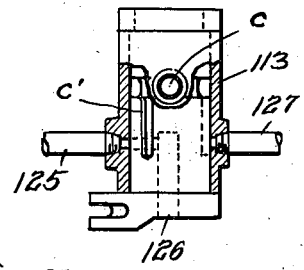
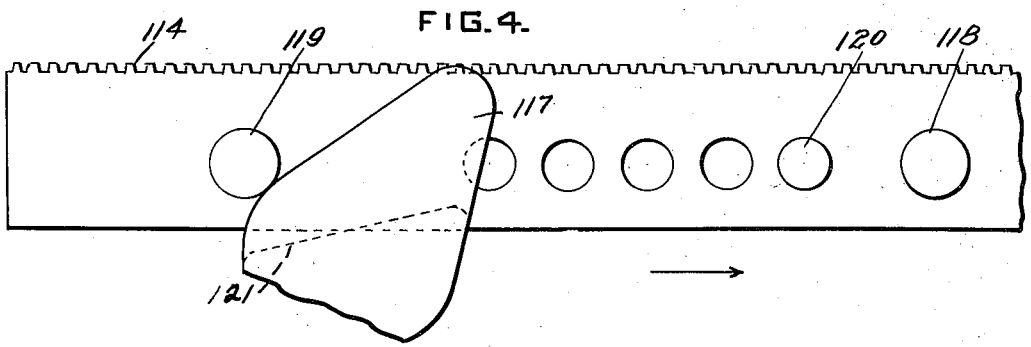
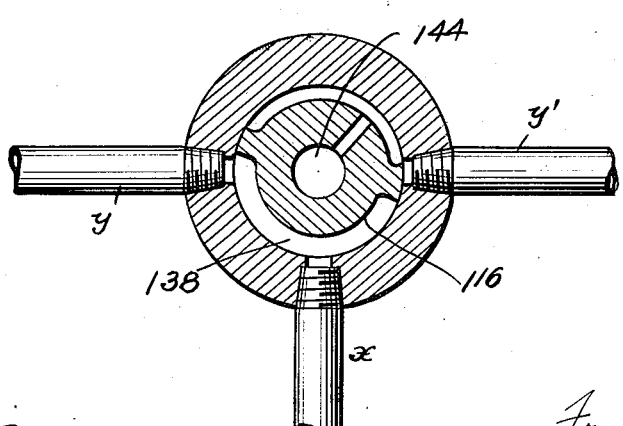
WITNESS
INVENTOR
Frank O'Neill
By Green & McCallister
His Attorneys

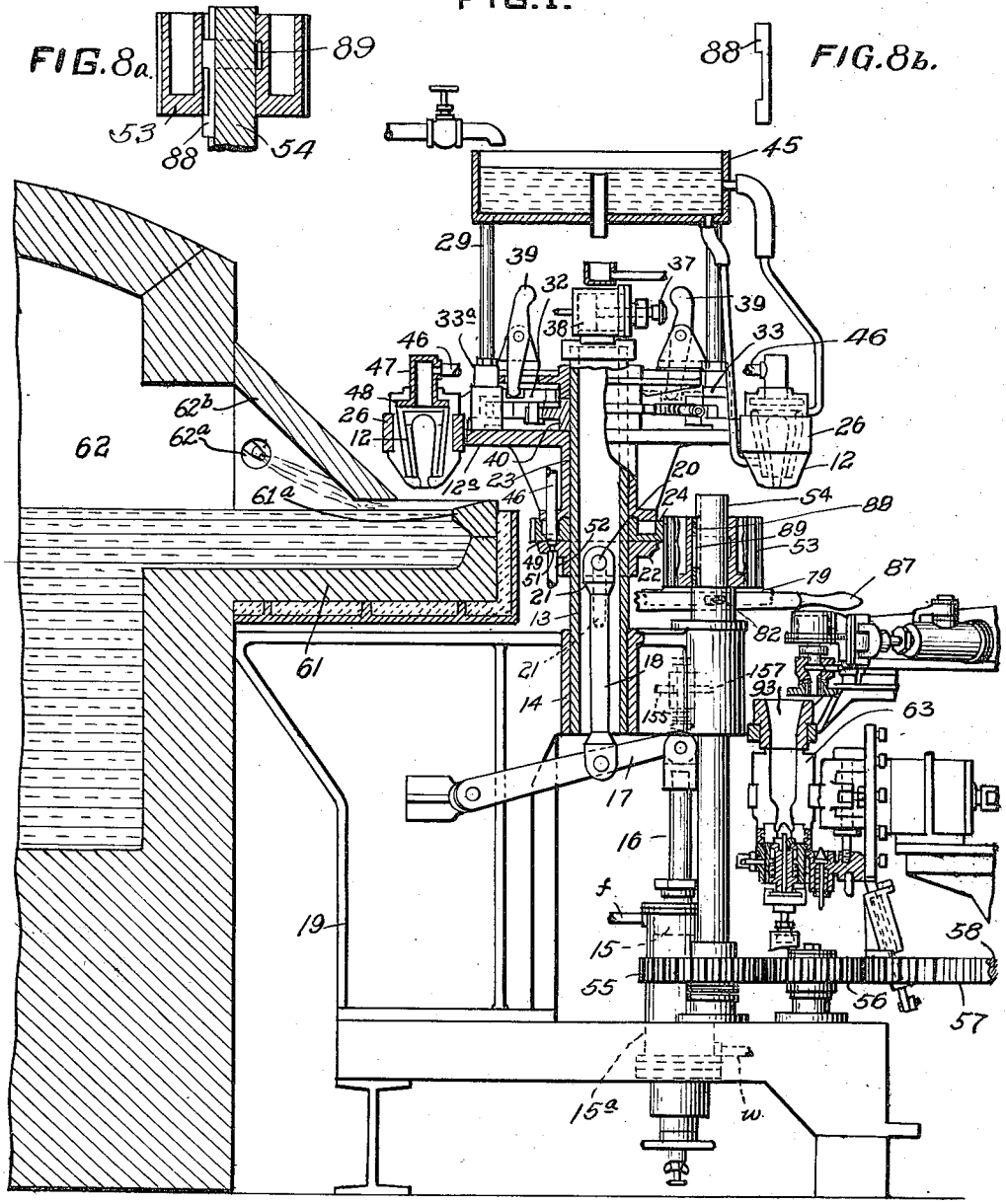

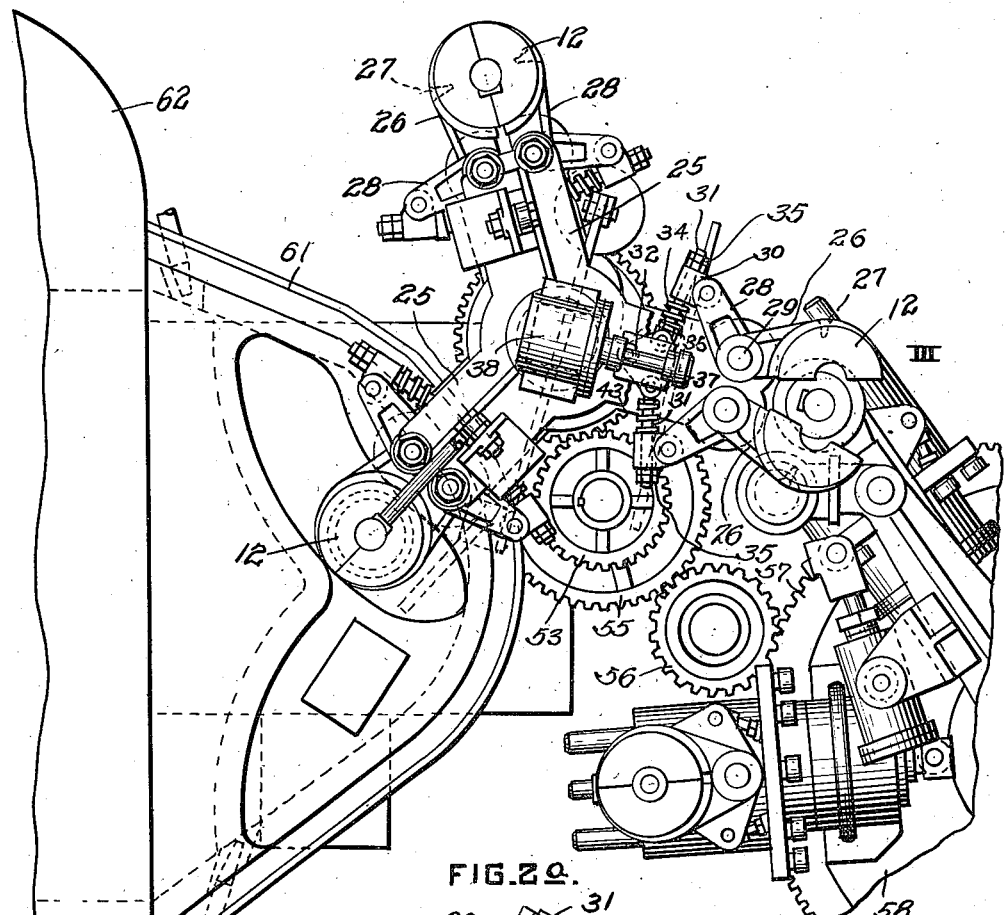
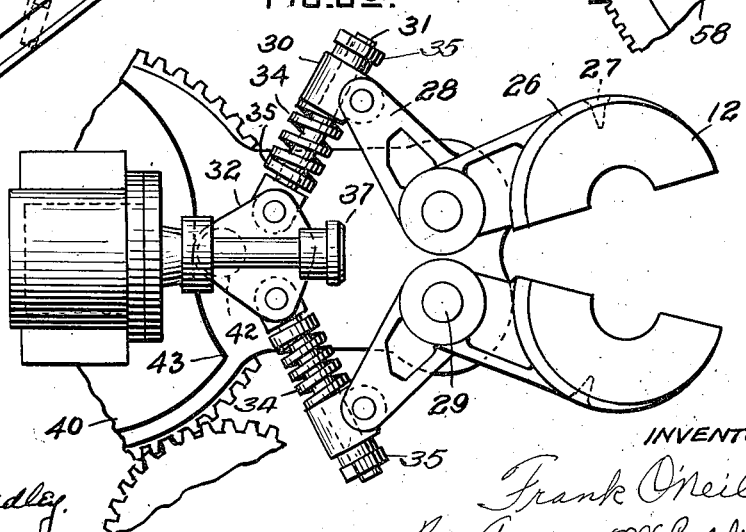

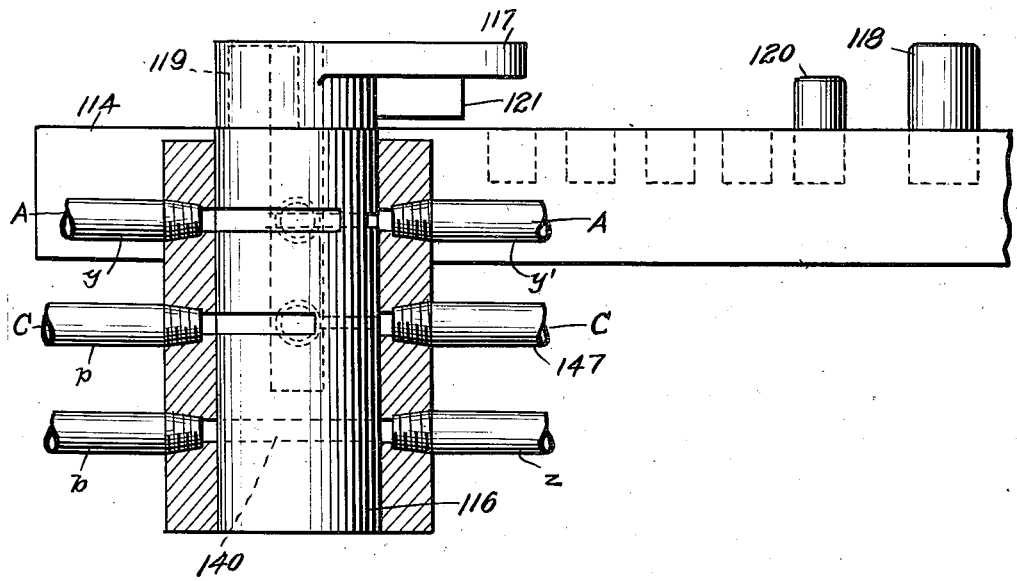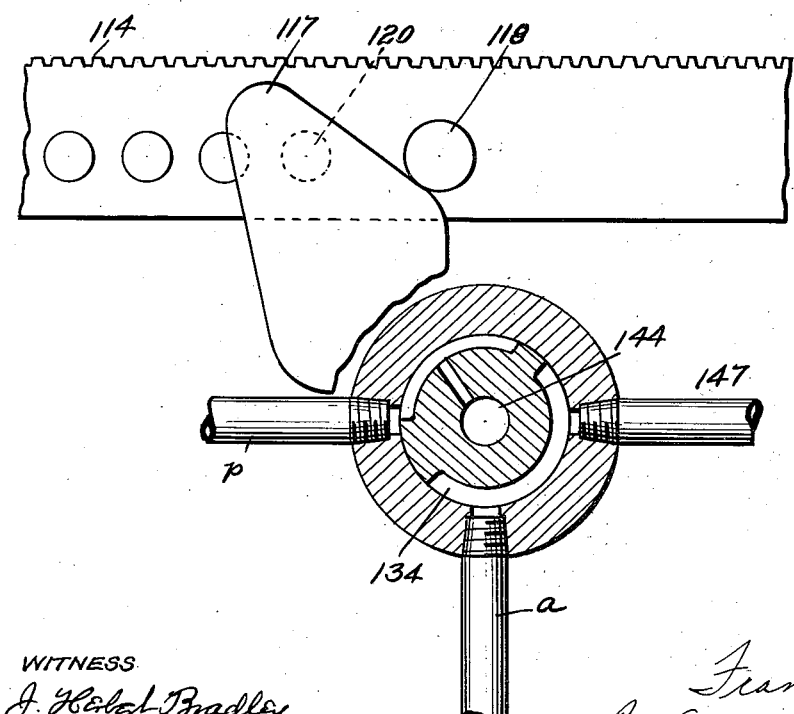

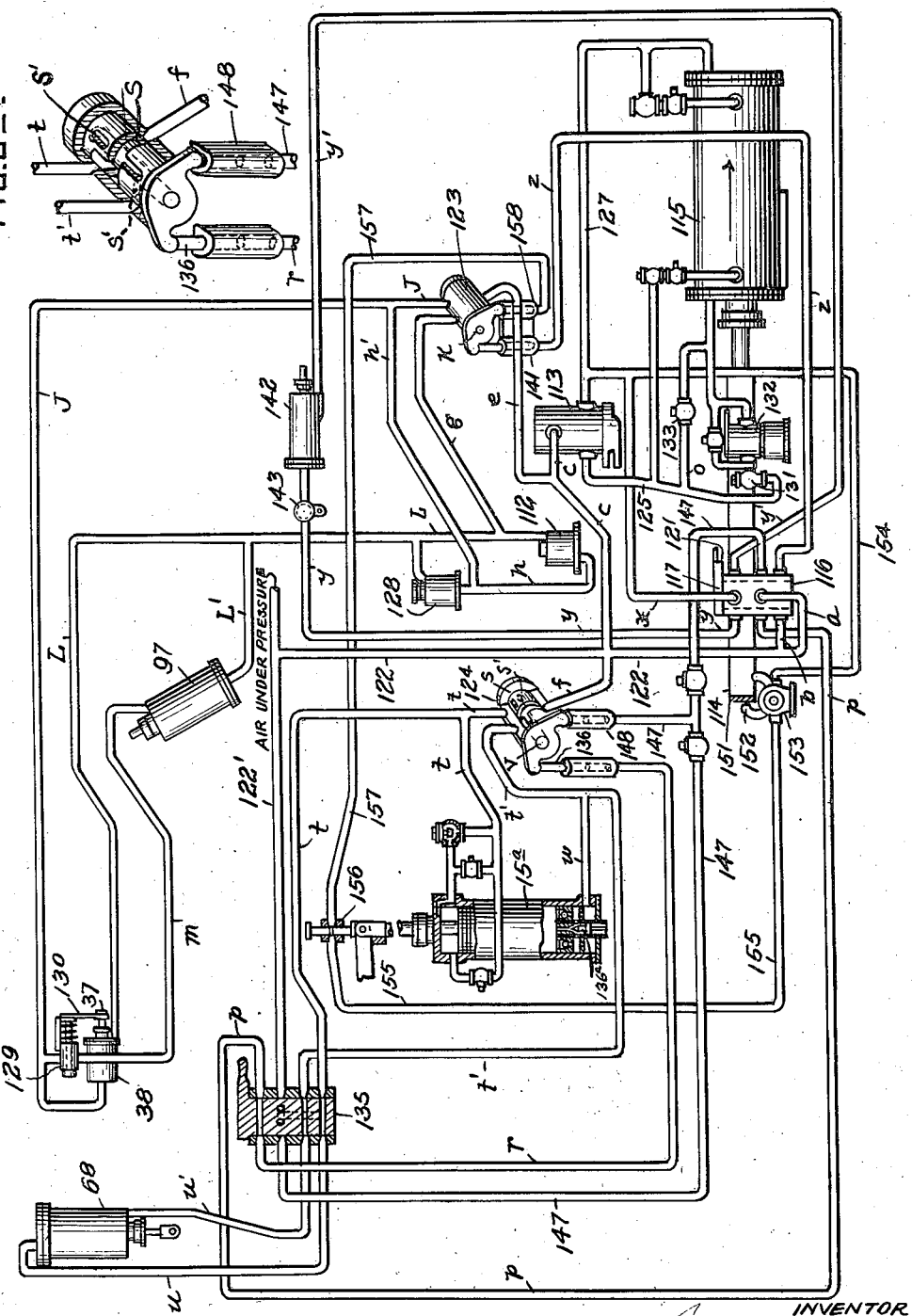

March 17, 1936. F. O'NEILL 2,034,055
GLASS FEEDING MACHINE
Original Filed June 23, 1926 10 Sheets-Sheet 6

WITNESS
J. Herbert Bradley

INVENTOR
Frank O'Neill
By Green & McCallister
His Attorneys

March 17, 1936.    F. O'NEILL    2,034,055
GLASS FEEDING MACHINE
Original Filed June 23, 1926    10 Sheets-Sheet 7

WITNESS
J. Herbert Bradley

INVENTOR
Frank O'Neill
By Green & McCallister
His Attorneys

March 17, 1936.  F. O'NEILL  2,034,055
GLASS FEEDING MACHINE
Original Filed June 23, 1926   10 Sheets-Sheet 9
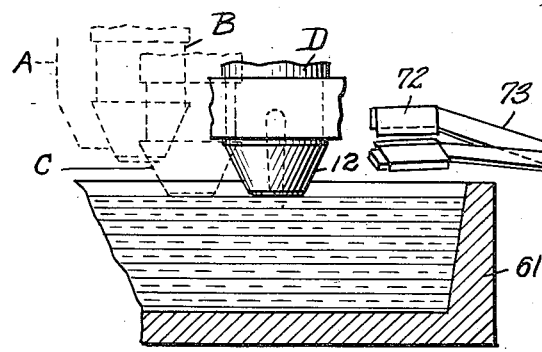
FIG.12.
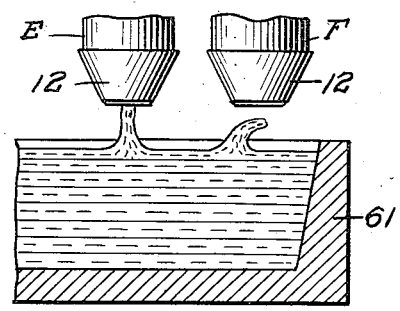
FIG.12ª.
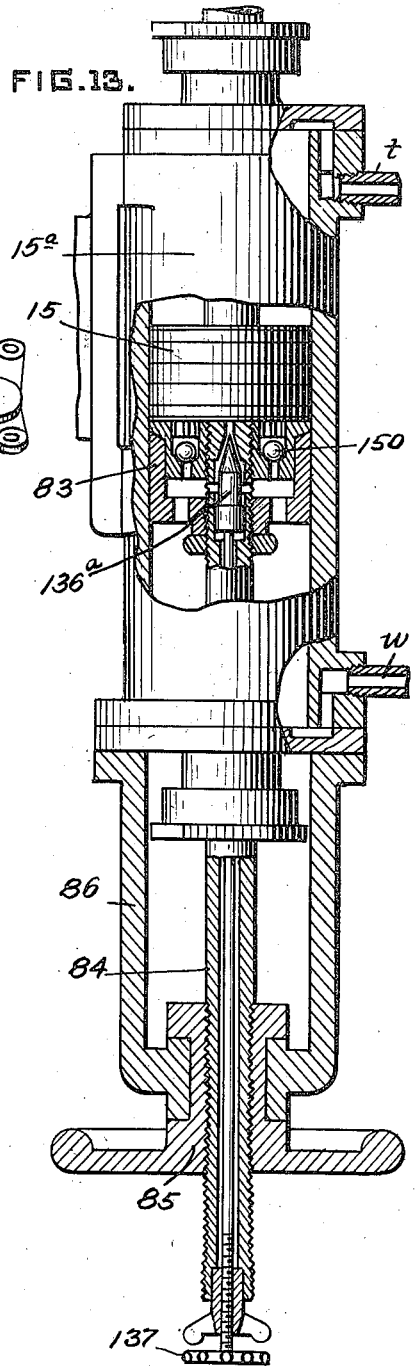
FIG.13.
WITNESS
J. Herbert Bradley
INVENTOR
Frank O'Neill
By Green & McCallister
His Attorneys March 17, 1936.  F. O'NEILL  2,034,055
GLASS FEEDING MACHINE
Original Filed June 23, 1926   10 Sheets-Sheet 10
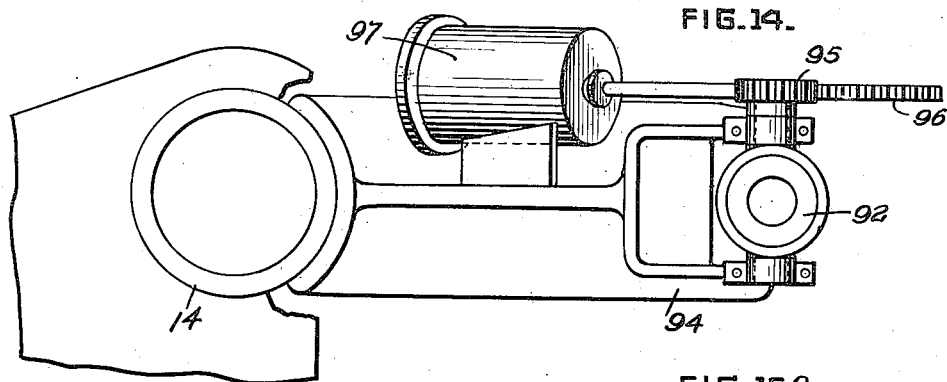
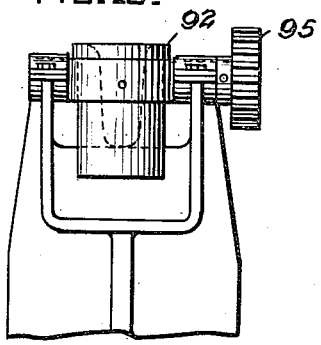
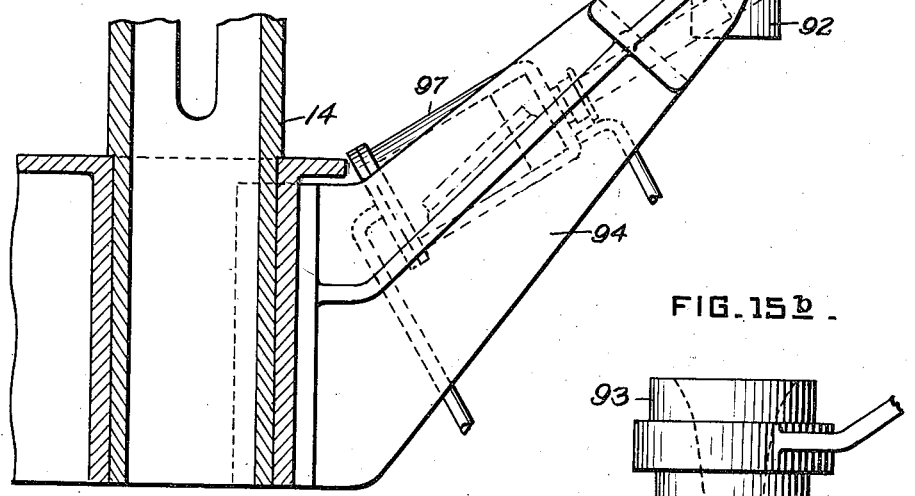
WITNESS
J. Herbert Bradley
INVENTOR
Frank O'Neill
By Green & McCallister
His Attorneys Patented Mar. 17, 1936

2,034,055

UNITED STATES PATENT OFFICE 2,034,055

GLASS FEEDING MACHINE

Frank O'Neill, Toledo, Ohio, assignor to Hartford-Empire Company, Hartford, Conn., a corporation of Delaware Application June 23, 1926, Serial No. 117,911
Renewed September 1, 1932

65 Claims. (Cl. 49—5)

This invention relates to glass feeding apparatus and particularly to apparatus for gathering mold charges and for delivering the same to molds.

An object of the invention is to produce an improved feeder which is capable of delivering mold charges of predetermined weight and size to the molds of an article forming machine.

A further object of the invention is to produce apparatus of the character described which is capable of gathering a mold charge of predetermined size from a batch of molten glass and in which means are employed for so severing the connecting stub or string between the mass and the mold charge as to provide a clear surface on the surface of the batch for subsequent gathers.

A further object is to produce an apparatus of the character described in which means are employed for collecting successive gathers from a batch of molten glass in such a way that the partially cooled stub severed from the gather is moved by the gathering operation away from the gathering point.

A further object is to produce an organized apparatus including means for gathering and delivering mold charges and means for finishing the mold charges into completed articles in which the mold charge gathering and delivering means are timed in their operation by the article finishing mechanisms.

A further object is to produce a glass feeding apparatus which is capable of gathering and delivering successive mold charges of different weights and shapes.

A further object is to produce a mold charge gathering apparatus in which means are employed for compensating for varying levels of the glass batch from which the mold charges are collected.

A further object is to produce simple and effective means in glass feeding apparatus such that the mold-charge forming apparatus may be easily connected to and disconnected from its operating mechanism, so that the apparatus may be quickly and readily moved into and out of operative relation with the container for the glass batch.

A further object is to produce an organized glass feeding and article forming machine in which manually controlled means are employed for holding the glass feeding apparatus out of operative relation with the receptacle containing the batch of molten glass but which at the same time permits the glass feeding apparatus to operate in timed relation with the article forming machine included as a part of the organized apparatus.

A further object is to produce new and improved means in glass feeder apparatus for controlling and timing the operation of the feeder in accordance with the operation of the article forming machine associated with the feeder.

A further object is to provide improved means in a feeder for eliminating or minimizing the effect of such shear marks as may be occasioned by severing the mold charge from the source of molten glass.

These and other objects are accomplished by means of apparatus embodying the features herein described and illustrated in the drawings accompanying and forming a part hereof.

In the drawings—

Figure 1 is a sectional view of a feeder embodying my invention and shown in connection with a fragmental section of a glass melting tank and a fragmental section of an article forming machine which forms a part of the organized apparatus herein referred to;

Fig. 2 is a top plan view of the apparatus shown in Fig. 1;

Fig. 2a is an enlarged view of a portion of the apparatus shown in Fig. 2;

Fig. 3 is a somewhat diagrammatic illustration of a lock bar and its operating mechanism which forms a detail of the present invention and, associated with other mechanisms, operates to control the timing of certain movements of the feeder apparatus;

Fig. 3a is a detail of the apparatus shown in Fig. 3;

Fig. 4 is a diagrammatic illustration of a portion of a control mechanism for the driving parts of the organized apparatus and is shown associated with a valve actuating lever which is actuated thereby and which controls the delivery of actuating fluid to various parts of the organized apparatus;

Fig. 4a is a transverse sectional view of the valve associated with the valve operating lever, the section being along the line A—A of Fig. 4b;

Fig. 4b is a longitudinal sectional view of said valve, and Fig. 4c is a transverse sectional view of said valve along the line C—C of Fig. 4b and shown in connection with a portion of the control mechanism illustrated in Fig. 4;

Fig. 5 is a diagrammatic view showing what may be termed a piping diagram in which portions of the apparatus are diagrammatically illustrated;

Fig. 5a is a detail of one of the rocker valves of Fig. 5 with its associated elements.

Fig. 8a is an enlarged side sectional view of a portion of the clutch mechanism shown in Fig. 1 in a raised position; and Fig. 8b illustrates a detail of Fig. 8a.

Figure 6:
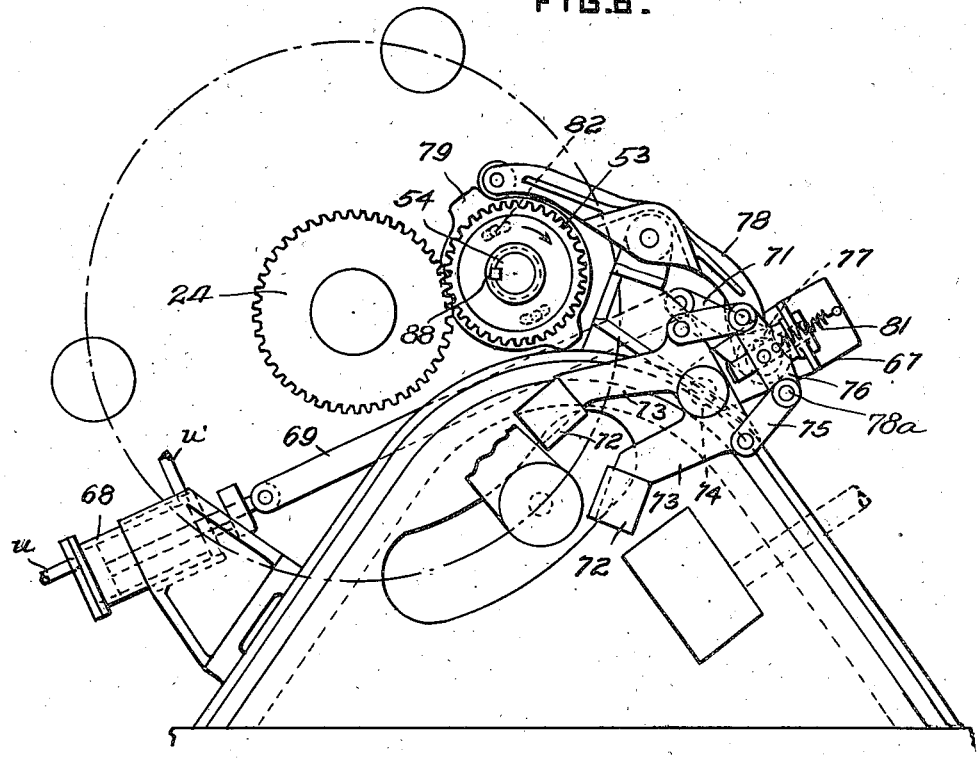
Fig. 6 is a plan view of a shear operating mechanism forming a detail of the present invention and shown associated with a diagrammatic illustration of a feeding apparatus and a fragmental elevation of a forehearth or batch receptacle.

Figs. 12 and 12a diagrammatically show the successive positions of the gathering cup during the operation of moving the cup into contact with the surface of the molten glass; in drawing a charge of glass into the cup; raising the cup away from the surface of the molten glass; and moving it to and past the shear operating position. The shears are diagrammatically shown in Fig. 12.

Fig. 13 is an elevation of a portion of the apparatus shown in Fig. 2, portions being broken away and shown in section for convenience of illustration;

Fig. 14 is a plan view of a charging inverting cup and its operating mechanisms which may be employed in connection with my invention;

Fig. 15 is a side elevation of the apparatus shown in Fig. 14;

Fig. 15a is a side elevation of the gathering cup with a portion of its supporting mechanism and Fig. 15b is a side elevation of a funnel or guide for guiding mold charges into the mold, together with a portion of its supporting mechanism. Figs. 15, 15a and 15b are shown in the relative positions which the illustrated apparatus occupies at the time of delivering a charge from the gathering cup to and through the funnel or guide;

Fig. 16 is an end elevation of the apparatus shown in Fig. 15, a portion being omitted for convenience of illustration.

It is well-established practice to deliver mold charges to article forming machines such as machines employing blow or press molds. One of the most usual forms of such feeding apparatus is the well-known plunger feeder in which the flow of molten glass through a submerged orifice is controlled by the reciprocations of a plunger which extends down through the glass and operates above the orifice.

One of the disadvantages of such feeders is that it is impossible to deliver successive gobs which differ materially in size and shape. This disadvantage will be apparent when it is understood that such feeders ordinarily operate in connection with automatic glass forming machinery; that a single feeder delivers mold charges to a series of successive molds forming a part of the article forming machine; and, where the plunger feeder is employed, all of the molds of the glass forming machine must be adapted to receive the same size gathers and to produce articles of approximately the same weight if not of substantially the same shape.

I overcome this disadvantage since with the glass feeder illustrated, I can successively deliver three radically different mold charges both from the standpoint of size and shape during each complete cycle of the feeder. With such an arrangement, the feeder may be employed with an article forming machine which is producing three radically different glass articles both from the standpoint of size and shape. This is particularly advantageous where small orders are to be filled from articles made by the feeder-fed article-forming machine.

Another disadvantage with the plunger type feeder is that the weight, and to some extent the shape of the mold charges are dependent upon the temperature of the glass from which they are formed and, as a result, the feeder needs constant adjustment under operating conditions ordinarily encountered in a glass plant. This disadvantage is overcome in apparatus embodying my invention, since the size and shape of each mold charge gathered and delivered by the feeding apparatus is constant even under varying temperature conditions.

Another disadvantage with the plunger type is the difficulty encountered on starting up the feeder after a shutdown such as occurs over night, or such as occurs during the operation of changing molds or repairing associated parts. Some means must be employed for closing the submerged orifice during these periods of shutdown and, as a result, considerable time and heat are wasted in restarting the feeder, since the parts must be reheated for the purpose of thawing out the chilled glass and releasing the stopper, no matter what type of stopper is employed, and some glass must be wasted, since glass must be run through the orifice for the purpose of obtaining the correct temperature conditions of the glass in the forehearth. With apparatus embodying my invention, shut down periods occasion no difficulty, since there is no flow orifice to be stopped and on starting up the apparatus, all that need be done is to control heat to obtain the desired temperature conditions.

The apparatus embodying my invention includes a mold charge gathering and delivering apparatus and an article forming apparatus which, in the present embodiment, consists of a blank forming machine and a blowing machine associated and interconnected by means of a transfer mechanism for automatically delivering the blanks formed in one portion of the apparatus to the blowing molds forming a part of the other portion of the apparatus. The feeder or mold charge gathering and delivering machine is so formed and constructed that its successive operations are controlled or timed by the operation of the article forming mechanisms and the arrangement is such that it may be operated to deliver successive mold charges or may be operated in timed relation with the forming apparatus without delivering mold charges. This latter feature is advantageous during the operation of changing molds either in the feeder or in the glass forming apparatus and during the operation of making repairs or changes in the glass forming apparatus.

As illustrated, the feeding apparatus consists essentially of a plurality of gathering cups or receptacles 12 which are adapted to successively project into a batch of molten glass and gather a charge therefrom. As shown, three such cups are mounted on what may be termed a reciprocable and rotatable carriage 12ᵃ which is adapted to rotate about a central axis, equi-distant from all of the cups 12, and to successively lower each cup into gathering contact with the batch of molten glass, contained in a forehearth 61. The carriage is also so manipulated that, after each gathering operation, it lifts, for the purpose of causing the gathering cup containing the fresh charge of molten glass, to clear the walls of the forehearth, and also for the purpose of raising the next successive cup to such a position that it may be lowered into contact with the surface of the glass in the receptacle by a further movement of the carriage.

As shown, the carriage 12ᵃ is mounted on a cylindrical column 13 which is located in a suitable way 14. The carriage is adapted to be reciprocated by a piston 15, located in cylinder 15ᵃ, through the agency of a piston rod 16, a lever 17 and a link 18. (See Figs. 1 and 13.) The lever 17 may be fulcrumed on any stationary pivot point and as shown in Fig. 1 is fulcrumed on a frame 19 which carries the weight of the associated parts and on which the way 14 is mounted.

The upper end of the link 18 is pivotally secured to a pin 20 which extends through oppositely disposed and elongated slots 21 formed in the column 13 and engages at its opposite ends a sleeve which forms a part of a pedestal 22. The column 13 is pressed into the way 14 and is rigidly secured thereto in any suitable manner such for example by means of a tie pin and consequently the movement of the pedestal is limited to vertical movements along the column. The column also guides both the rotary and vertical movement of the carriage 12ᵃ which is supported by the pedestal 22. As shown, the carriage is provided with a downwardly extending flange or sleeve 23 which surrounds the column and is provided at its lower end with a gear 24 which performs a triple function, i. e. supporting the carriage on the pedestal 22, transmitting rotary motion to the carriage, and controlling the exhausting of the cups 12. As shown, the carriage is provided with three radial arms 25 which are equally spaced around the column and each of which supports one of the cups 12.

Each cup is formed in two parts, the line of division being in a vertical plane extending through the axis of rotation of the carriage. Each division of the cup is removably mounted in a semi-circular support 26 which is pivotally mounted on the carriage. As shown, the separate halves of the cup are provided in their outer face with a recess which receives the support 26 and a screw such as shown at 27 in Fig. 2 may be employed for rigidly securing the part of the cup to the support.

Each cup support has a bell crank 28 integrally formed therewith which is pivotally mounted on a pin 29 mounted on the carriage, and the location and arrangement of the bell cranks is such that they are capable of moving the two parts of the cup together to form a glass receiving receptacle, which is open at its lower end, and of moving them apart for the purpose of delivering a mold charge previously drawn into the open ended receptacle.

The bell cranks 28, associated with each co-operating pair of cup supports 26, form a part of the opening and closing mechanism for the cups. As shown, the free ends of the bell cranks are provided with pivotally mounted sleeves 30 which are known as mold fingers and through which eye bolts 31 extend. These eye bolts are pivotally secured to a slide block 32 which is mounted in radial ways secured to a spider 33, forming a part of the carriage 12ᵃ. The outer ends of the eye bolts are provided with nuts or heads which limit their movement with relation to the sleeves 30 and an adjustable coil spring 34 surrounds each eye bolt and operates to transmit movements of the slide block to the bell crank. As shown, a nut 35 is threaded on each eye bolt for the purpose of varying the tension of the associated spring 34 and it will be apparent that this operative connection between each eye bolt and its co-operating sleeve is a yielding connection. This is for the purpose of preventing breaking of the parts in case the movement of the gathering cup or its supports 26 is obstructed.

Each slide block 32 is actuated by means of a pressure actuated plunger 37 which is connected to a piston located within the cylinder 38 (Fig. 1). The plunger engages a finger 39 pivotally mounted on the spider 33 and extending downwardly through a suitable slot formed in the spider, so that its rounded or ball-shaped end engages a recess formed in the upper face of the associated slide block 32.

The cylinder 38 is rigidly mounted on the upper end of the column 13 and consequently its position is fixed throughout the operation of the apparatus. The position of the slide block is controlled by a cam 40 which is held against rotation by being splined to the column 13 but which is capable of reciprocating with the carriage 12ᵃ. As shown in Fig. 2a, the slide block is provided with a roller 42 which engages the face of the cam 40 and thereby moves the slide block outwardly to close the associated gathering cup as the cup leaves the position indicated by III in Fig. 2 and Fig. 11, and holds the cup 12 closed until it is again moved toward the position III, at which time the cam roller 42 passes off the face of the cam 40 at a point indicated by the reference numeral 43 in Fig. 2a. With such an arrangement, each cup 12 is positively held closed throughout substantially two-thirds of its travel around the column 13.

As shown in Fig. 1, each half of cup 12 is water cooled and as illustrated, this cooling is accomplished by a thermo-siphon system which is diagrammatically illustrated in Fig. 1 and includes the water jacketing space of the separate parts of the cups a water receptacle 45, shown supported on the upper ends of the pins 29, and connections between the jackets and the receptacle.

Suction or vacuum pressure is applied to the interior of each mold cup through a suction line 46 which communicates with a chamber formed in a suction head 47 of each cup 12. As shown, the head 47 is separately formed from the two-part cup and is provided with a laterally extending circular flange 48 which seats on the upper surfaces of the two parts of the cup and is of such dimensions that it remains in place even when the two parts of the cup are opened at the delivery station III (Fig. 2). A recess is in effect formed in each half cup 12 for receiving and centering the flange 48.

As shown in connection with the lefthand mold cup of Fig. 1, each cup section is provided with a depression in its lateral face which is in open communication with the vacuum chamber formed in the head 47 and which communicates with the mold cavity, formed by the two parts of the cup, through the clearance space between these parts. With this arrangement, suction is exerted approximately throughout the entire length of the glass receiving cavity formed in the cup and there is no possibility of the suction line being clogged with molten glass, since the clearance space is too small to permit the entrance of molten glass.

Each suction head 47 communicates through the piping 46 with a separate suction port 49 formed in the lower or bottom face of the gear 24 and adapted to move into register with a suction port 51 formed in the pedestal 22. This last-mentioned port communicates through piping 52 with a source of low pressure, such as a vacuum pump.

As shown, the carriage 12ª is rotated by a pinion 53 which is splined on a vertical shaft 54, the lower end of which is provided with a gear 55 meshing with an idler gear 56 journaled on the frame 19 of the feeder apparatus. The idler gear in turn meshes with a table gear 57 which is secured to or forms a part of a table 58 of the article forming apparatus. During the operation of the apparatus, the carriage revolves with the table 58 and, as will hereinafter be described, its rotary motion is intermittent, the relation of the gears 55, 53 and 24 being such that the carriage 12ª will be swung through a third of a revolution for each movement of the table 58 which moves a mold carried thereon, to a charge receiving position.

As has been stated, the carriage of the feeder reciprocates or moves up and down during its rotation, so as to move the successive gathering cups 12 into contact with the surface of the glass contained within the forehearth 61, which forms an extension of a melting tank 62. During this operation, the carriage moves downwardly from the position shown in Fig. 1 to a position such that the lower end of the gathering cup which is at that time located above the forehearth, will engage the surface of the glass contained therein. This downward movement is accomplished by the downward movement of the piston 15 and, as the carriage is completing one portion of its cycle of operation.

The lower end of the cup moves into contact with the surface of the glass in the forehearth before the cup ceases its rotary movement. As the carriage comes to rest, suction is applied to the cup in engagement with the molten glass through the port 51 of the pedestal, and the communicating pipes and passages, with the result that a charge of molten glass is drawn up into the cup. It will, of course, be understood that during the gathering operation, one other cup of the carriage is located at the discharge station III (Fig. 2) and that during this period of rest, the plunger 37 (Fig. 1) has been forced outwardly by a charge of fluid pressure delivered to its operating cylinder and, through the agency of the fingers 39 and slide block 32, has operated the bell cranks 28 to open the cup at the delivery station and deliver a charge into the blank mold 63 carried by the table 58, which at that period is located immediately below the discharging gathering cup.

The next operation of the feeder is to lift the charged gathering cup out of contact with the glass contained within the forehearth. This is accomplished by the upward movement of the plunger 15 and, when that plunger has reached the top of its stroke, the carriage, and the table 58 start to rotate for the purpose of moving the charged cup to the discharging position and for the purpose of moving an empty mold to the gathering position.

The upward movement of the table lifts a thread of glass from the surface of the glass contained within the forehearth and the rotary movement of the carriage further attenuates the stub and drags it from the gathering location. While the cup is moving away from the gathering position, the attached stub or thread of glass adhering to it is severed by means of shears 72 shown in Figs. 6, 7 and 8.

In Figs. 12 and 12a, I have diagrammatically shown several of the successive positions of a gathering cup 12 as it moves toward and away from the charge receiving positions. As the cup reaches the position A, immediately above the edge of the forehearth, it starts to move downwardly as indicated by the dotted line representations shown at B and C. This downward movement is comparatively rapid and consumes but a small arc of the circular travel of the cup. As shown at C, the cup contacts with the surface of the molten glass within the forehearth 61 and continues to skim the surface of the glass until it arrives at the full line position D. This is the position of rest and the position during which vacuum is applied to the suction head 47 for the purpose of drawing in a charge of molten glass into the cup.

After a charge has been drawn into the cup, the cup is elevated to the position shown at E in Fig. 12a. It then moves along its circular path toward and past the position illustrated at F, at which the shears, diagrammatically illustrated in their operative position in Fig. 12, operate and sever the thread of glass adhering to the bottom of the charge and to the surface of the batch from which the charge was gathered.

It will be apparent that the upward movement of the cup 12 draws the thread of glass from the batch and also to some extent attenuates the thread. It will also be apparent that the lateral or circular swing of the cup toward the position F, not only further attenuates the thread but also drags it away from the gathering position so as to provide a clear surface of glass for the next gather. The shears operate as the cup is moving along its circular path and thus severs the stub in such a way that it falls back into the glass batch at a point some distance from the gathering position and in such a way as to be quickly reincorporated into the molten batch.

Figure 7:
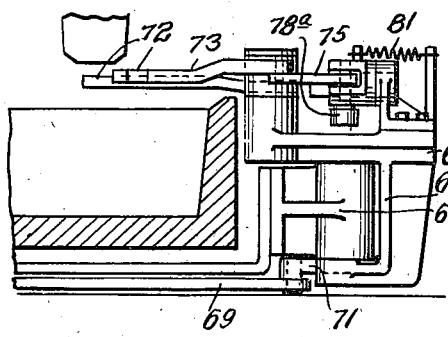
Fig. 7 is a front elevation of the apparatus shown in Fig. 6 (from the tank side and looking toward the feeding apparatus)
Figure 8:
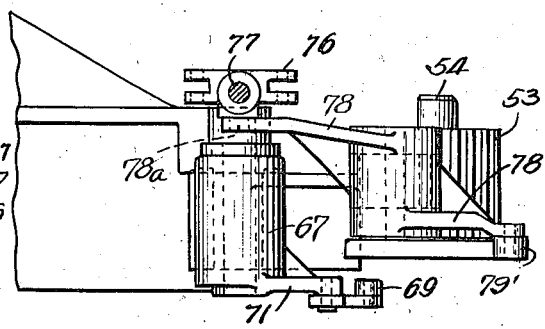
Fig. 8 is a side elevation of the apparatus shown in Fig. 7, the view being taken at 90° from that of Fig. 7.

As illustrated in Figs. 6, 7 and 8, the shears are mounted on a bracket 66 (see Fig. 7) suitably secured to the structure of the forehearth 61 in such a way that they are capable of being swung from a cutting position above the forehearth to an inoperative position at one side thereof and out of the heat generated within the forehearth. This is accomplished by mounting the shears on a swinging bracket 67 which is pivotally secured to the bracket 66 by means of a pin connection. This bracket 67 is adapted to move the shears to operative or inoperative position by means of a pressure cylinder 68 (Fig. 6) which is provided with a piston operating through a link 69 pivotally attached to an arm 71 formed as a part of the bracket 67.

The shears mounted on the bracket include the usual knives 72 which are carried by bell-crank arms 73 pivotally secured to the bracket 67 by means of a pin 74 (see Fig. 6). The outwardly extending arms of the bell cranks are pivotally secured to links 75 (see Figs. 6 and 7) forming a part of a toggle connection which includes a guided cross-head 76 pivotally secured to each of the links. The cross-head is guided in its reciprocatory motion by means of a pin-like guide 77 rigidly secured to the bracket 67 and is adapted to be moved in one direction, to close the shears by means of a cam actuated lever 78 which is fulcrumed on a bracket formed on the supporting base for the bracket 66.

The lever 78 is operatively connected to the cross-head 76 by means of a pin 78$^a$ and an elongated slot formed in the lever. The opposite end of the lever is provided with a cam roller 79' which engages and is operated by a cam 79, which in the illustrated embodiment, is shown as operatively coupled to the pinion 53 and consequently to the shaft 54. The operating lobes of the cam are so positioned that the shears will cut twice during each rotation of the pinion 53 and the relationship between the speed of the cam and the rate of revolution of the carriage is such that the shears will cut three times during each revolution of the carriage. The return or shear opening stroke of the cross-head is accomplished by means of a spring 81, but it will also be apparent that the relationship between the lever 78 and the cross-head 76 is such that the operation of swinging the shears outwardly or away from the operative position will occasion or at least aid the opening movement of the shears. Thus, it is seen that the toggle and the reciprocating or sliding crosshead connection between the shears 72 and the operating cam 79 acts in a compensating manner to insure that the shears are operatively connected to be opened or closed irrespective of the position to which they have been moved by the mechanism 68.

In order to facilitate the proper timing of the shears with relation to the operation of the carriage, some means are preferably provided for adjusting the position of the cam 79 with relation to the pinion 53. As shown, this is accomplished by providing segmental slots 82 in the cam which receive the screws for securing the cam in the adjusted position on the pinion 53.

Another feature of the present invention is the means employed for adjusting the lowermost position of the carriage to compensate for varying glass levels in the forehearth 61. This is accomplished by providing the operating cylinder 15$^a$ of the carriage with an adjustable head for varying the lower limit of the downward stroke of the piston 15. As shown in Fig. 13, the lower head 83 of the cylinder 15$^a$ is supported on a longitudinally adjustable rod or stem 84 which projects through the lower end of the cylinder casing and through an adjusting sleeve 85 carried by a yoke 86 secured to the cylinder casing. A threaded connection is provided between the rod 84 and the sleeve 85, the sleeve being rotatably mounted in the yoke and provided with a hand wheel for turning it. Under such conditions, the cylinder head 83 may be raised and lowered by turning the hand wheel, and in this way the lower limit of the throw of the piston 15 may be varied to vary the lowermost position of the vacuum cups 12. As seen from the drawings, and particularly from Figs. 1, 2, and 10, the melting tank 62 is provided with an extending forehearth 61 from the opening in the top of which molten glass is gathered by cup 12. In order to better conserve heat in the molten glass, the forehearth 61 is provided with an inwardly extending rim 61$^a$ whose top inclines inwardly to the normal level of the glass.

Since the forehearth is of the upwardly open type, I have found it advisable to restrict the size of the opening, in order to hold the temperature of all portions of the glass being sucked up by the cup 12 at a more even value. The effect is decidedly noticeable and there is a marked difference in the thickness of the side walls if the outside glass runs too cold. The hotter glass will stretch farther than the colder glass, and the cold side of the gob and of the resultant article will be heavier than the hot side. Thus, the restricted opening is of utmost importance in the production of an effective type of article.

The furnace or melting tank is provided with a wall 62$^b$ that extends downwardly and outwardly over the top of the forehearth and aids in restricting the opening therein. As seen, the lower end of wall 62$^b$ terminates on the horizontal plane of the highest portion of rim 61$^a$, and is spaced from the latter and from the normal level of the molten glass in the forehearth. The feed opening in the forehearth is preferably curved in outline, and its width may be of a size (see Fig. 1) to permit the mouth of the cup 12 to enter, but to prevent an entry of the upper non-inclined portion of the cup.

The flame jets 62$^a$ are directed to center or concentrate upon the spacing between the lower end of wall or roof 62$^b$ and the top of the glass level, see Figure 1. By the above arrangement I have been enabled to attain a uniformity of temperature of the glass being fed not before thought possible; the articles thus produced are exceptionally superior.

Another feature of the present invention is the means employed for operatively disconnecting the carriage from its driving mechanism and at the same time providing means for assuring the proper positioning and proper timing of the parts at the time of re-establishing the operating connection. As shown in Figs. 1, 8$a$, and 8$b$ this is accomplished by so splining the pinion 53 to the shaft 54 that the operating connection between the two may be easily and quickly broken by simply moving the hand lever 87 to raise the pinion 53 and the associated shear operating cam 79. The shaft 54 is provided with a keyway of just sufficient length to receive the key 88 (see Figs. 1 and 6), which is substantially U shaped (see Fig. 8$b$), i. e., so formed as to provide two projecting portions at its opposite ends, the intermediate portion of the key being cut away.

The piston 53 is provided with a co-operating keyway which is interrupted between its ends by an enlarged bore or annular groove 89 which is of sufficient depth and width, longitudinally of the shaft 54, to receive the uppermost projecting portion of the key 88. With such an arrangement, an upward movement of the gear with respect to shaft 54 will cause the uppermost projecting portion of the key to enter the annular groove 89 and the lowermost projecting portion of the key will move, relatively to the gear, beyond the lower edge of the gear, as shown in Fig. 8$a$, so that the key connection between the shaft 54 and the pinion will be broken, although the pinion will continue to find a bearing on the shaft. With such an arrangement, the upward motion of the pinion will break the operative connection between the carriage and its driving shaft, but the shaft cannot again be operatively connected to the pinion until the proper relationship between the driving mechanism and the position of the carriage is again re-established. This will be apparent, since the pinion 53 cannot be moved downwardly, to render the key 88 effective as a driving connection between it and the shaft, until the key is moved into alignment with the keyways in the pinion. It will be apparent that, by so disconnecting the carriage from the driving mechanism, the carriage is free to be turned by hand and may be so turned that all parts carried by it are moved to such a position that they are protected from the heat of the forehearth.

Under some conditions of operation, it may be desirable to turn the gathers prior to delivering them to the mold. In Figs. 14, 15 and 16, I have illustrated such apparatus which consists essentially of a cup or receiver 92 located immediately below the cups 12 as they occupy the discharging position illustrated by III in Figs. 2 and 11. This cup is adapted to receive the charge from the discharging cup 12 and then to deliver the charge to the funnel or guide 93 which is associated with an article forming machine.

As shown, the cup 92 is mounted on trunnions carried by a bracket 94 which in turn is carried by the ways 14. The cup is also provided with a gear 95 which meshes with a rack 96 actuated by a plunger not shown but located within a cylinder 97. The cylinder is included within the operating system of the organized apparatus and the delivery of actuating fluid to and from it is controlled in the manner hereafter described so that the reciprocations of the rack, in response to the movements of its operating piston, turn the cup or receiver 92 over for the double purpose of inverting the gather, delivered to the receiver from the gathering cup 12, and of delivering this gather through the guide 93 to a mold forming a part of the article producing apparatus. This operation takes place while the feeder and the article forming machine are momentarily at rest. Figs. 15a, 15 and 15b illustrate the relative positions of a cup 12, the receiver 92 and guide 93 at the time of delivering a charge from the cup 12.

Figure 9:
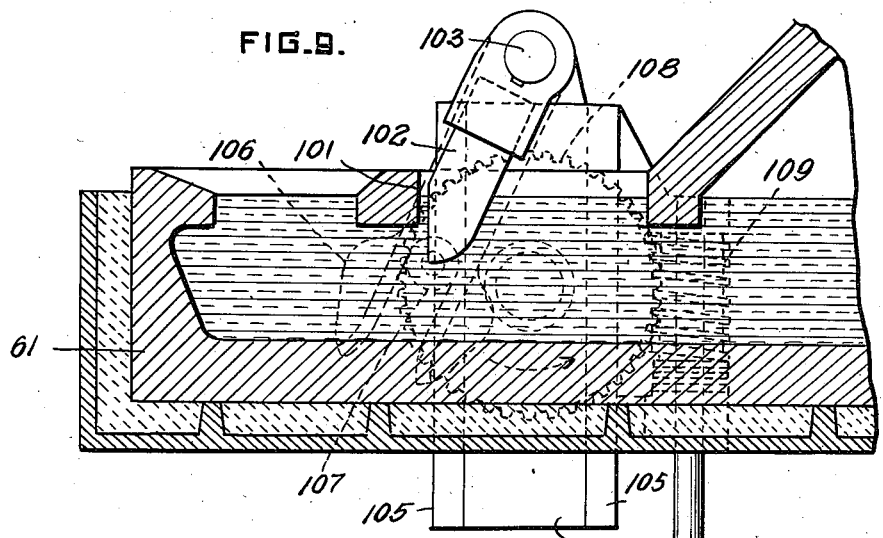
Fig. 9 is a side view of a detail of my invention.
Figure 10:
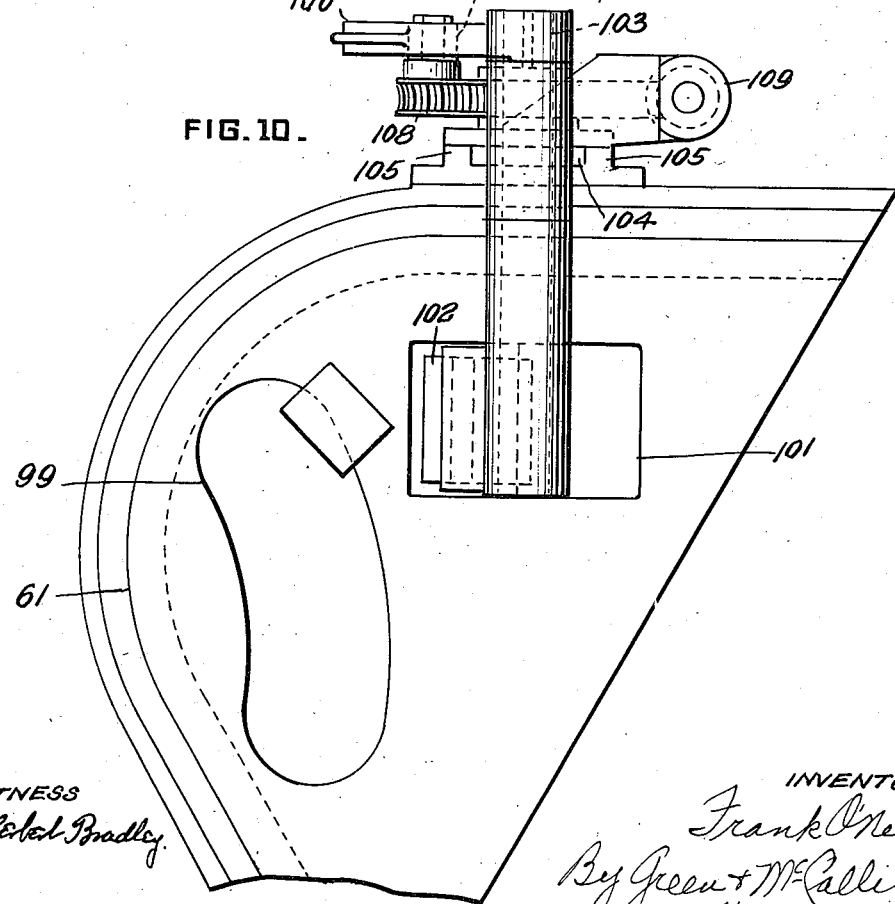
Fig. 10 is a plan view of the mechanism shown in Fig. 9.

In Figs. 9 and 10, I have illustrated a still further detail which may be employed in connection with my invention. While the method of gathering glass as specifically illustrated in Figs. 12 and 12a provides a clear surface of molten glass for each successive gather, it may be desirable, under some conditions of the molten glass, to provide additional means for insuring that such a clear surface is provided.

In Figs. 9 and 10, I have illustrated a paddle and its operating mechanism which is capable of creating a current or flow in the glass contained within the forehearth 61, for the purpose of insuring a movement of the severed stubs which will prevent them from interfering with subsequent gathering operations. It will, of course, be apparent that each severed stub is reincorporated into the body of glass contained within the forehearth but, under some temperature or other conditions of the glass, the movement of the stub, in response to the pull of the gathering cup, may not be sufficient to provide a clear surface for subsequent gathers and the reincorporation of the stub may be delayed.

The forehearth is shown roofed over for the purpose of conserving heat, but the roof is provided with an elongated opening 99 into which the gathering cups move and a second opening 101 through which a paddle 102 projects. This paddle is preferably formed of clay or similar material and is mounted in a holder carried by a shaft 103. As shown, the shaft is rotatably mounted in suitable bearings carried and formed on a guide block 104 which in turn, is mounted in suitable ways 105 secured to the side of the forehearth. An arm 106 is rigidly mounted on the opposite end of the shaft 103 and its free end is bifurcated so that it straddles an eccentric pin 107 carried by a worm wheel 108. The worm wheel is suitably mounted on a bracket carried by the ways 105 and meshes with a worm 109 which may be driven from any suitable source of power.

As the worm wheel rotates, the eccentric pin 107 not only elevates and lowers the shaft 103 but also oscillates that shaft. The rotation of the worm wheel is in the direction indicated by the arrows in Fig. 9, and the arrangement is such that the paddle will lower into the glass, move in one direction in the glass, rise above the surface of the glass, and move back to its initial position where it again enters the glass and moves forward. This is accomplished by reason of the fact that the pin 107 reciprocates the guide block 104 during the rotation of the wheel 108 by reason of its connection with the shaft through the arm 106. This periodic impelling of the glass within the forehearth in one direction causes the glass into which the severed stub settles, to move away from the gathering position, and thus insures clearing the gathering surface.

As previously stated, the feeder described forms a part of an organized apparatus including an article forming apparatus. As illustrated, the article forming apparatus consists of a blank forming machine including the table 58 and a blow or finishing machine, not shown. The operating shaft 54 of the feeder is geared to the table gear 57, and in order to obtain the proper timing of the blowing or finishing machine, it is geared to the table 58 but in such a way that it turns in the same direction as the table 57.

In my Patent No. 1,462,652 of July 24, 1923, I have illustrated certain details of the blank forming and blowing mechanism, together with a transfer mechanism for delivering blanks; consequently, it is unnecessary to go into further particulars in this application concerning these details except to show the relation of the organized apparatus and the timing mechanism employed for the different parts thereof.

In Fig. 5, I have disclosed a piping diagram and have shown with considerable detail important parts of the organized apparatus which contribute to the operation of the various parts of the apparatus and also to the apparatus as a whole.

Throughout the description of the operation of the apparatus, reference has been made to this diagram and to the structure shown in connection therewith.

Referring first to Fig. 3 and Fig. 3a, the mold carrying table 58 is adapted to be locked in position by means of a lock bar 110 during the period that a gather is being drawn into one cup 12 and a gather is being delivered from another and a transfer is being made to the blow table associated with the table 58. As shown, this bar is actuated by a lever 111 through the agency of a pressure piston contained within a cylinder 112. The lever 111 also actuates the plug valve 113 which plays an important part in the operation of the entire mechanism, in effect functioning as a timing valve for the driving mechanism which rotates the table 58 of the article forming mechanism and consequently the table 12a which carries the gathering cups 12 of the feeder.

The rotation of these tables is accomplished by means of a rack 114 shown in Figs. 4, 4b, 4c and 5.

This rack drives the gear 57, or a gear meshing therewith through an over-running device, and is actuated by a plunger operating in a cylinder 115 (Fig. 5). As shown in Figs. 4, 4a, 4b, 4c and 5, the rack is associated with a valve 116 which is provided with an actuating lever 117 adapted to be engaged by pins 118, 119 and 120 carried by the rack. As shown in Fig. 4b, the lever is provided with a short ledge 121 which is so located that it is engaged by the shorter pin 120 carried by the rack. The extending portion of the lever is so located that it clears this pin but is engaged alternately by the pins 118 and 119 of the rack. With this arrangement, the valve 116 occupies different positions during each cycle of operation of the rack.

As the rack completes its driving stroke, the valve 116 is moved to one extreme position by the pin 119 and in this position it delivers air under pressure to certain of the operating devices as will be more fully pointed out. As the rack travels in the opposite direction, at which time rotation of the feeder table 12a and the mold carrying tables of the article forming mechanisms has ceased by reason of the fact that the over-running device is employed, the pin 120 passes over the ledge 121 without moving the valve 116. At the end of this idle stroke of the rack, the pin 118 shifts the valve to its other extreme position, and then during the driving stroke of the rack, the pin 120 picks up the lever ledge 121 and moves the valve to its intermediate position.

If we will assume that the valve is in the position to which it is moved at the end of the idle stroke of the rack, we will find that all the co-operating apparatus is set to accomplish the first of the four cycles of operation.

Referring to Fig. 5, it will be found that air under pressure is delivered to the pipe 122 and from that pipe is delivered to the valve 116 through branch pipes a and b. It is also delivered to the valve 113 (Figs. 3, 3a and 5) through the branch pipe c and to a rocker valve 123 through branch pipe e. Air is also delivered from the pipe 122 to a second rocker valve 124 through a branch pipe f.

As stated, the valve 113 functions as a timing valve in that it times the delivery of actuating air pressure to the cylinder 115. Under the conditions assumed, live air is to be delivered from the valve 113 through the pipe 125 to the driving end of the cylinder 115. This, however, cannot be accomplished until the lock bar 110 is withdrawn from the table 58. As previously stated, the lock bar is actuated by a plunger contained in the cylinder 112 and as shown in Fig. 5 this cylinder can only receive operating air from the valve 123 for withdrawing the lock bar. Assuming, therefore, that the valve 123 is in the position illustrated in Fig. 5, and that when in this position, the high pressure air line e is placed in communication with a line g, it will be apparent that air under pressure is delivered to the upper end of the cylinder 112 while the lower end of that cylinder is exhausting through the line h, h' and J. It may be stated that the valve 123 is substantially similar in construction to the valve 124 and that details of construction will be described in connection with the last-named valve. However, when the valve 123 is in the position illustrated, the pipe J is placed in communication with a central exhaust port k. Under these conditions, the lock bar is withdrawn from the table 58 and the valve 113 is shifted to such a position that the pipe c is placed in communication with the pipe 125 by means of the slot c' shown in Fig. 3a. In this position, the rear end of the cylinder 115 is placed in communication with an exhaust port 126 (Fig. 3a) through piping 127. It will be apparent that upon delivering live air to the valve 113, the valve 123 also delivers live air through the branch pipe g and a pipe L to one end of the cylinder 38 for the purpose of moving the plunger 37 out of engagement with the operating finger 39 of the cup 12 which is located at station III. See Figs. 1 and 2. This releases the guide block 32, so that the gathering cup may be closed by the cam 40 as the carriage 12a continues its rotary motion. Air under pressure is also delivered from the pipe L through branch pipe L' to the cylinder 97 for the purpose of reversing the receiver 92 so that it is in a position to receive the gather as it drops from the next cup 12; and live air is also delivered to the upper end of the cylinder 128 which forms a part of the article forming mechanism, viz., the cylinder which actuates the plunger that forms the initial opening in the parison located in the neck mold. The plunger is withdrawn by this operation of the cylinder 128. It will also be apparent that the opposite ends of each of the cylinders 38, 97 and 128 are connected to the piping J and consequently to the exhaust port k of the valve 123. The cylinder 97 is connected to the exhaust through line m, valve 129, which is actuated by finger 130 on plunger 37, and through line J.

From the foregoing, it will be apparent that the operations just described will be accomplished while the valve 113 is being moved to the position to deliver air under pressure to the driving end of the cylinder 115, and that these operations are accomplished before the rack 114 starts to move on its driving stroke.

As shown, air under pressure is delivered to the driving end of the cylinder 115 through the one-way valve 131, a cushioning valve 132 and a bleeder valve 133 which is located in a bypass o. While the cushioning valve forms a detail of the present invention, its details are not essential to the present description except to state that the valve is so arranged that it cuts off the main flow of air to the cylinder 115 prior to the end of the driving stroke and that the piston is carried to the end of the driving stroke by the momentum of the parts actuated by it and is then held in that position by the air pressure introduced through the bleeder valve 133.

As the rack moves on its driving stroke in the direction indicated by the arrow associated with the cylinder 115 in Fig. 5, the ledge 121 of the lever 117 is engaged by the pin 120 and the valve 116 is moved so that the slot 134 (Fig. 4c) establishes communication between the line a and the line p. This delivers air under pressure through safety valve 135 and line r to the operating cylinder of a plunger 136 which shifts the position of the valve 124. Air under pressure is then delivered from the line 122 through line f, slot s of the valve 124 to the line t. This line is branched so that it delivers air to the upper end of the cylinder 15 and also through the safety valve and the line u to the upper end of the shear swinging cylinder 68. The opposite end of this cylinder communicates with the exhaust port v of valve 124 through line u', safety valve 135 and line t'. This latter line is connected to the lower end of the cylinder 15a through the branch w. Communication between the line t and the exhaust port v is established by means of a slot s' formed in the valve 124.

These air line connections swing the shears 72 to an inoperative position away from the heat of the forehearth through the operation of the cylinder 68; and also drop the carriage 12a so that a cup 12 carried by it, moves downwardly and finally into contact with the surface of the glass in the forehearth 61. The exhaust from the lower end of the cylinder 15a is controlled by the adjustable valve 136a which is capable of being adjusted by means of a hand wheel 137 as shown in Fig. 13. This regulates the rate of the downward movement of the carriage 12a.

At the end of the drive stroke, the pin 119 strikes the lever 117 and shifts the valve so that the slot 138 is placed in communication with the lines $x$ and $y$ (see Fig. 4a) and the lines $b$ and $z$ are placed in communication through a passage 140 formed in the valve 116. (See Fig. 4b).

The line $b$ is a live air line; consequently, air under pressure is delivered through $z$ to the plunger operating cylinder 141 of the valve 123. This shifts the valve so as to reverse the air line connections heretofore described. Air under pressure is then delivered from the branch $e$ through $J$, $h'$ and $h$ to the lower end of the lock bar operating cylinder 112 and the lock bar 110 engages the table 58 and holds it stationary. The opposite end of this cylinder 112 is connected to the exhaust port $k$ through the line $g$. Air under pressure is also delivered to the lower end of the cylinder 128 which moves the plunger into the parison mold of the article forming machine. The opposite end of this cylinder is connected to the exhaust through the lines L and $g$. Air under pressure is also delivered through the line J to the cylinder 38 so as to move the finger 37 outwardly for the purpose of opening the gather cups 12 located at the discharge position III of Fig. 2. Air under pressure is also delivered to the cylinder 97 but this air is delivered through the mechanically actuated valve 129 which is controlled by a finger 130 carried on the pin 37. As a result, air under pressure is not delivered to the line $m$ and the cylinder 97 until after the discharging cup 12 is opened; consequently, the reversing operation of the receiver is timed by the valve 129 so as to insure the delivery of the gob or charge to the receiver before it turns over to deliver the charge to the parison mold carried by the table 58. The rear end of the piston 97 communicates with the exhaust port $k$ through the piping L', L and $g$.

The operation of the lock bar cylinder 112 has reset the valve 113 of Figs. 3 and 3a so that air under pressure is now delivered from the line $c$, through the port $c'$ to the line 127. This line was open to the exhaust port 126 of valve 113 prior to the resetting of the valve. Simultaneously with the delivery of air under pressure to the end of the cylinder 115, air under pressure is also delivered through the branch line $x$, the valve 116 and the line $y$ to the transfer cylinder 142. This cylinder forms a part of the article forming mechanism and performs the function of moving the parison or blank from a parison mold and into one of the blow molds of that mechanism. The delivery of air to this cylinder 142 is, however, controlled by a mechanically actuated valve 143, located in the line $y$, and actuated by the opening of the parison or blank molds. This is for the purpose of insuring the opening of these molds before the transfer of the parison or blank is attempted by the operation of the cylinder 142. Reference to Fig. 4a will disclose the fact that in this position of the valve 116 the discharge end of the cylinder 142 communicates with the exhaust port 144 of valve 116 through the port $y'$.

With the valves in the positions described, air under pressure is delivered to the idling end of the cylinder 115 and air is exhausted from the driving end of that cylinder through the piping 125 which is then connected with the exhaust port 126 of the valve 113 as shown in Fig. 3.

As the rack 114 moves on its idle stroke, the ledge 117 is engaged by the pin 118, thereby shifting the valve 116 to close off the lines $y$ and $p$. The line $x$ is brought into alignment with the line $y'$ and the line 147 is brought into alignment with the live air branch line $a$ through the slot 134. As a result of these connections, air under pressure is delivered from the line $x$ through the line $y'$ to the transfer cylinder 142, for the purpose of withdrawing the transfer mechanism back to a position in which it will receive a parison or blank from the blank forming machine. The opposite end of this cylinder communicates with the exhaust through the line $y$, which in that position of the valve 116 communicates with the port 144. Air under pressure is also delivered from the line 122 and the branch line $a$ through the valve 116 to the line 147, and to the plunger operating cylinder 148 of the valve 124. This resets the valve 124 and delivers air under pressure from the line 122 and branch line $f$ to the bottom of the cylinder 15 through line $w$, the line $f$ being placed in communication with the line $w$ by the slot $s$ of the valve 124.

The air delivered to the lower end of the cylinder 15a passes the ball check valves 150 and raises the piston 15 which, through the agency of the lever 17 and link 18, raises the carriage 12a, thereby moving a charged cup 12 to the position shown in Fig. 12a. Air is also delivered through the branch line $t'$ through the safety valve 135 and the line $u'$ to the shear-operating cylinder 68 so as to move the shears 72 into the operative position. Under these conditions, the opposite end of the cylinder 68 is connected to the exhaust port $v$ of the valve 124 through the line $u$ and valve 135 and line $t$; and the upper end of the cylinder 15a is connected to the exhaust port $v$ through the line $t$.

At the extreme end of the idle stroke, the finger 151 at the end of the rack 114 strikes the finger 152 of valve 153, thereby moving the valve so that the branch line 154 is placed in communication with the air line 155. Air under pressure then passes from the line 127, the branch line 154 and the line 155 to a mechanically actuated valve 156 which is opened when the piston 15 reaches the upper limit of its travel. The opening of this valve places the line 155 in communication with a line 157 and delivers air under pressure to a plunger operating cylinder 158 of the valve 123. This resets the valve 123 to the position originally described in which air under pressure is delivered from the branch $e$ to the line $g$; and in which the line J is placed in communication with the exhaust $k$.

This completes the cycle of operation of the valve 116 and also the cycle of operation of the mechanisms associated with it. In this connection, it will be kept in mind that the pedestal-gear 24 and the pedestal 22 are provided with the cooperating ports 49 and 51 through which suction or vacuum pressure is applied through piping 46 to the suction head 47 of the gathering cup in contact with the molten glass of the hearth 61.

Figure 11:
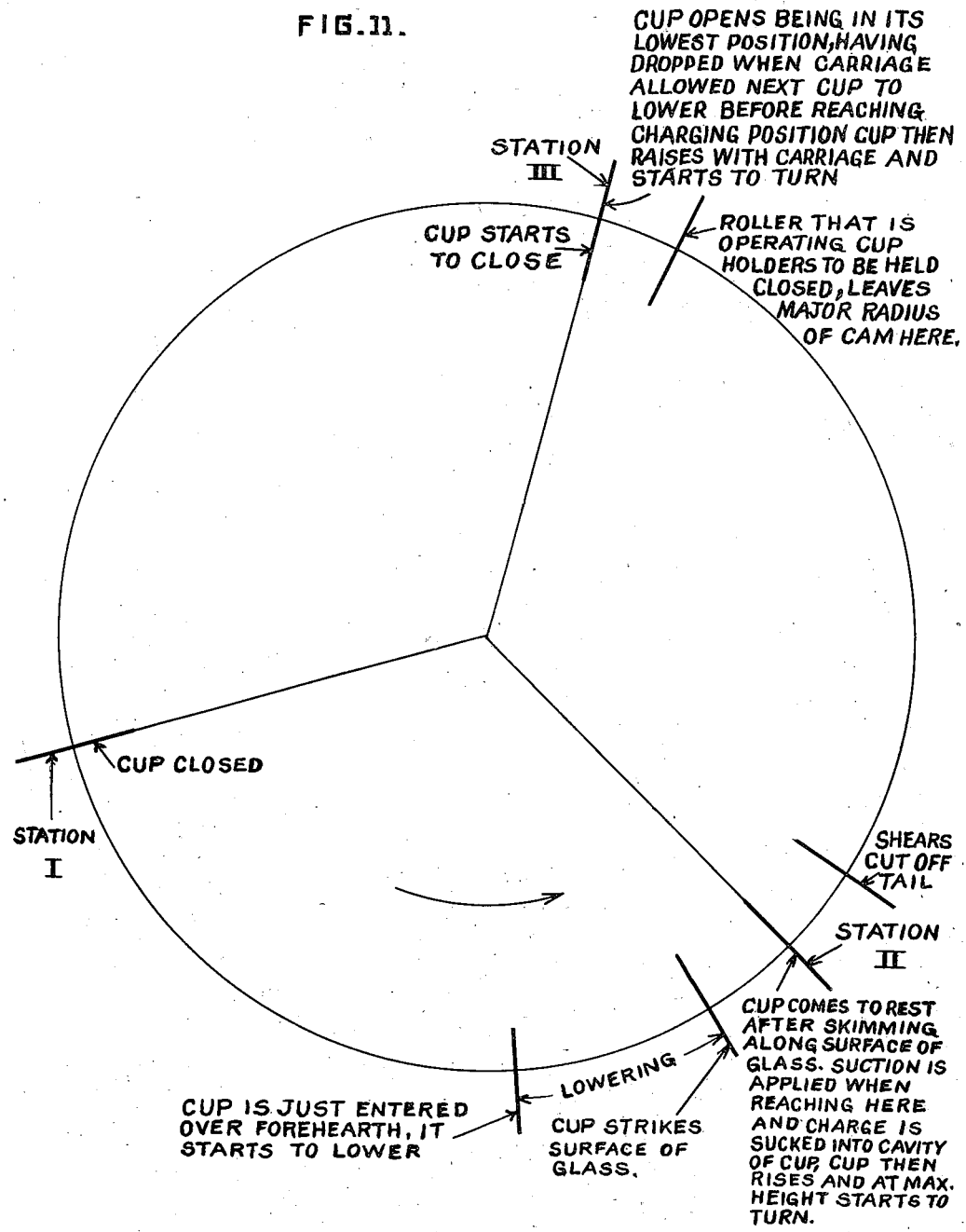
Fig. 11 is a diagram indicating the cycle of operation of each gathering cup forming a detail of the invention.

The cycle of the feeder mechanism is also graphically set forth in connection with the chart of Fig. 11 wherein the orbital travel of one gathering cup 12 is indicated in connection with the points in this travel at which various operations take place. The point marked "Station II" indicates the gathering position of the cup, "Station III" the discharging position and "Station I" an intermediate position at which the cup comes to rest due to the fact that one of the other two cups is receiving a charge of glass and the other is delivering a charge.

The safety valve 135, shown in Fig. 5, is employed for the purpose of discontinuing the timed relation between the table 58 and the feeder mechanisms. This valve has two positions, one in which the connections previously described are established, and the other in which live air will pass from the pipe 122' through the valve to the pipe 147, thereby holding the trip valve 124 in such a position that air under pressure is delivered to the bottom of the cylinder 15ª so as to elevate the table 12ª and hold all the cups 12 out of contact with the molten glass in the forehearth; and also so as to pass air under pressure through the line u for the purpose of swinging the shears to the inoperative position and away from the heat of the forehearth.

It will be apparent from the foregoing description that the feeding mechanism is timed from the article forming mechanism and that the arrangement is such that during each period of rest, one gathering cup or receptacle 12 is receiving a charge; another is delivering a charge to a parison mold or receptacle; and a parison or blank is being transferred from one parison mold carried by the table 58 to a blow mold or receptacle forming a part of the blowing mechanism, no portion of which is illustrated. It will also be apparent that the table 12ª of the feeder is raised and lowered during its rotary motion and that the shears 72 swing to the operative position and are operated as the table 12ª is moving. With this arrangement, together with the timing of the operation of the various mechanisms described in connection with Fig. 5, it will be apparent that the period of rest may be shortened and that its duration may be limited to the time it takes to transfer a parison or blank from one of the parison molds to one of the blow molds.

While I have described but one embodiment of my invention, it will be apparent that various changes, additions, omissions and modifications in the apparatus illustrated may be made without departing from the spirit and scope of the invention as set forth by the appended claims.

What I claim as new and desire to secure by Letters Patent is:

1. A glass feeder comprising a rotatable table, at least one gathering cup carried by said table, means for lowering and raising said table to move said cup into and out of charge receiving engagement with a batch of molten glass, shears for severing the thread of glass adhering to the charge received by said cup, means for swinging said shears to and from an operative position, interconnected mechanisms for controlling the operation of said table raising and lowering means and said shear swinging means and means for actuating said shears to sever the thread after the thread has been elongated by the movement of said cup.

2. In combination in a feeder, a rotatable table, at least one gathering cup carried by said table, driving means for actuating said table to move said cup from a gathering position to a delivering position, means for lowering and raising said table to move said cup to and from a gathering position, a timing mechanism for said driving means, a timing mechanism for said lowering and raising means, and means controlled by said last mentioned means for controlling the operation of said first-mentioned timing mechanism.

3. In combination in a feeder, a rotatable table, at least one gathering cup carried by said table, driving means for actuating said table to move said cup from a gathering position to a delivery position, means for lowering and raising said table to move said cup to and from a gathering position, a timing mechanism for said driving means, a timing mechanism for said lowering and raising means, means actuated by said table raising and lowering means for controlling the operation of said first-mentioned timing mechanism, and means actuated by said driving means for controlling the operation of said timing mechanism for said raising and lowering means.

4. In combination in a feeder, a rotatable table, at least one gathering cup carried by said table, driving means for rotating said table, means for lowering and elevating said table, shears, means for swinging said shears from an operative to an inoperative position, means for actuating said shears to sever the thread of glass from the charge carried by said cup while said cup is moving, means for locking said table against rotation and separate interconnected timing mechanisms for controlling the operation of said driving means, said shear swinging means, said elevating and lowering means and said locking means.

5. In combination in a feeder, a rotatable table, at least one gathering cup carried by said table, driving means for intermittently rotating said cup; means for locking said table against rotation, means for raising and lowering said table, a timing mechanism for said table locking means, a timing mechanism for said driving means controlled by said first-mentioned timing mechanism, and means controlled by said raising and lowering means for controlling the operation of said first-mentioned timing mechanism.

6. Glass forming apparatus, comprising a mold carrying table, driving means for intermittently rotating said table, a feeder table, at least one gathering cup carried by said feeder table, and gearing between said tables including a clutch mechanism for operatively connecting and disconnecting said tables such that said tables when connected always occupy the same relative positions.

7. In combination in a glass forming mechanism, a rotatable table, at least one charge gathering cup carried by said table, means for rotating said table, means for raising and lowering said table, timing mechanism for controlling the operation of said means, and independently operable means acting upon said timing mechanism for raising said table and thereby rendering said rotating means ineffective.

8. In combination, in a glass forming mechanism, a rotatable mold carrying table, a feeder table operatively coupled thereto to rotate therewith, a gathering cup carried by said table, means for lowering and raising said feeder table to move said cup into and out of contact with a batch of molten glass, a timing mechanism for controlling the operation of said last-mentioned means, and independently operable means shifting said feeder table and said timing mechanism so that said feeder table will be moved out of an operating position.

9. In combination in a glass forming apparatus, a mold carrying table, a rotatable table operatively coupled to said mold carrying table, at least one gathering cup mounted on said table, means for lowering and elevating said cup into and out of gathering relation with a batch of molten glass, means for separating the parts of said cup to discharge glass therefrom, a receiver, means for inverting said receiver, and means controlled by said cup-part separating means for controlling the operation of said inverting means.

10. In combination in a glass forming mechanism, a rotatable table, at least one charge gathering cup carried by said table, driving means for rotating said table, pressure actuated means for raising and lowering the table into and out of gathering relation with a batch of molten glass, a timing mechanism controlled by said driving means for controlling delivery of actuating pressure to said raising and lowering means, and means for rendering said timing mechanism ineffective for controlling the delivery of actuating pressure to said raising and lowering means, said means for rendering the timing mechanism ineffective delivering actuating pressure to said raising and lowering means to hold said cup in a raised position during the operation of said driving means.

11. In combination in a glass forming mechanism, a rotatable table, at least one charge gathering cup carried by said table, driving means for rotating said table, pressure actuated means for raising and lowering said cup into and out of gathering relation with a batch of molten glass, shears for severing molten glass depending from said cup, pressure actuated means for swinging said shears to and from an operative position, a timing mechanism controlled by said driving means for controlling the delivery of actuating pressure to said raising and lowering means and to said shear swinging means, and manually controlled means controlling delivery of actuating pressure to said raising and lowering means and to said shear swinging means, said means rendering the timing mechanism ineffective and delivering actuating pressure to said raising and lowering means for elevating said cup and to said shear swinging means and swinging said shears to an inoperative position during the operation of said driving means.

12. In a glass forming apparatus, a rotatable table, a gathering cup carried by said table, driving means for rotating the table pressure actuated means for raising and lowering the cup out of and into gathering relation with a batch of molten glass, means for actuating said cup to deliver a gathered charge, means for receiving and inverting a charge delivered from said cup, timing mechanisms for said pressure actuated means and said cup actuating means controlled by said driving means, and means actuated by said cup actuating means for controlling the operation of said charge receiving means.

13. In combination in a glass forming apparatus, a rotatable table, at least one gathering cup carried by said table, driving means for rotating the table, means for lowering and raising said cup into and out of gathering relation with a batch of molten glass, timing mechanism for said driving means and said raising and lowering means, means controlled by said driving means for controlling one operation of said timing mechanism, and means actuated by said raising and lowering means for controlling the other operation of said timing means.

14. In combination in a glass forming apparatus, a rotatable table, at least one gathering cup carried by said rotatable table, driving means for said table, pressure actuated means for raising and lowering said table, shears, pressure actuated means for swinging said shears to and from an operative position, a timing mechanism responsive in operation to movements of said driving means for controlling the delivery of actuating pressure to and from said table raising means, and said shear swinging means and means actuated by the rotation of said table for actuating said shears while said table is rotating.

15. A glass gathering and delivering mechanism, comprising at least one gathering cup, means for swinging said cup to a glass gathering and a glass discharging position, means for raising and lowering said cup, and timing means for controlling one movement of said cup swinging means, controlled by said cup raising and lowering means, and timing means for controlling the lowering movement of said raising and lowering means, controlled by said cup swinging means.

16. In combination in a glass forming mechanism, a mold carrying member, means for locking said member in a charge receiving position, means for moving said member, a feeder mechanism driven by said member, and comprising a reciprocable cup carrying member, gathering cups carried thereby and means for successively applying suction to the cavity of each cup to draw a charge of molten glass thereinto and means timed by the operation of said locking means for opening said cups to deliver mold charges therefrom.

17. In a glass gathering apparatus, a movable table, means for intermittently moving said table, a gathering cup carried by said table, means for raising and lowering said cup out of and into gathering relation with a batch of molten glass, shears for severing glass depending from said cup after the gathering operation, means for actuating said shears, a timing mechanism for controlling the operation of said moving means, a timing mechanism for controlling the operation of said raising and lowering means and shear actuating means, and means actuated by said raising and lowering means for rendering said first mentioned timing mechanism effective and ineffective.

18. In combination in a glass forming machine, a movable table, at least one charge gathering cup carried by said table, driving means for moving said table, means for elevating and lowering said gathering cup out of and into gathering relation with a batch of molten glass, a timing mechanism controlled by said driving means for controlling the operation of said elevating means, and manually controlled means independent of said timing mechanism for actuating said elevating means to raise said cup and for rendering said timing mechanism ineffective for controlling the operation of said raising and lowering means during the operation of said driving means.

19. The combination with a glass feeder, of at least one gathering cup, means for moving said cup to glass-gathering and delivering positions, means for moving said cup into gathering relation with respect to a batch of molten glass at the glass-gathering position, timing mechanism for controlling movement of said first-mentioned cup-moving means, timing mechanism for controlling movement of said second-mentioned cup-moving means, shears, means for swinging said shears to and from an operative position, said shear-swinging means being timed by said last mentioned timing mechanism.

20. In a glass gathering apparatus, a cup-carrying member, a gathering cup carried by said member, means for actuating said cup for delivering a gather therefrom, means for receiving said gather, and means timed by the operation of said cup actuating means for inverting said receiver.

21. In a glass gathering apparatus, a mold carrying member, a feeder member operatively coupled thereto for movement therewith, driving means for said members, at least one gathering cup carried by said feeder member, means for actuating said cup to deliver a gather carried thereby, a receiver for accepting gathers delivered from said cup, means timed by said cup actuating means for inverting said receiver after the gather is received and delivering it to said mold carrying member.

22. In a glass forming apparatus, a mold carrying member, a feeder member operatively coupled thereto for movement therewith, means for moving said members, said feeder member having at least one gathering cup associated therewith, means for actuating said cup to deliver a gather carried thereby, a receiver for receiving the gather delivered from said cup, means for inverting said receiver to deliver the gather received to said mold carrying member, a timing mechanism timed by said cup actuating means for actuating said receiver inverting means, and interconnected timing mechanisms for said driving means and said cup actuating means.

23. In a glass forming apparatus, a mold carrying member, a feeder member having at least one gathering cup associated therewith, said feeder member being operatively coupled to said mold carrying member for movement therewith, means for intermittently driving said members, means for actuating said cup to deliver a gather carried thereby, a receiver for receiving gathers delivered from said cup, means for inverting said receiver to deliver a gather received to said mold carrying member, and means timed with the operation of said driving means for actuating said cup actuating means and said receiver actuating means when actuation of said driving means has ceased.

24. In a glass forming apparatus, a mold table, a plurality of gathering cups operatively coupled to said table for rotation therewith, driving means for rotating said tables, means for lowering each cup during rotation for receiving a gather of glass, means operating said cups for successively delivering gathers carried thereby, a receiver successively accepting gathers of glass from each of said cups, and means for inverting said receiver to successively deliver gathers to said mold table.

25. In a glass forming apparatus, a mold carrying member having a plurality of molds, a plurality of gathering cups operatively coupled to said member for rotation therewith, driving means for intermittently rotating said member, and means for lowering a cup during rotation of said table for receiving a gather of glass, means operating said cups for successively delivering gathers of glass carried thereby, a receiver for receiving the successive gathers of glass from each of said cups, means successively inverting said receiver to successively deliver gathers to each of said molds, and said inverting means being timed by said cup operating means for operation after said cup operating means has delivered a charge of glass from one of said cups.

26. The combination in a glass forming apparatus, a mold carrying member, a cup carrying member operatively coupled to said mold carrying member, means for moving said cup into and out of gathering relation with respect to a batch of molten glass, means separating parts of said cup for discharging a gather of glass therefrom, a receiver for accepting the gather, means for inverting said receiver, and means controlled by said cup part-separating means for controlling the operation of said inverting means.

27. In combination in a glass forming apparatus, a mold carrying member, a cup carrying member operatively coupled to said mold carrying member, means for moving said cup carrying member into and out of gathering relation with respect to a batch of molten glass for receiving a gather therefrom, means separating parts of said cup for discharging the gather therefrom, a receiver for accepting the gather so discharged, means for inverting said receiver, a mechanically actuated valve controlled by said cup part-separating means for controlling the timing of said inverting means.

28. In a glass forming apparatus, a mold carrying member, a cup member operatively associated with said mold carrying member for movement therewith, driving means intermittently moving said members, means for moving said cup member into and out of gathering relation with a batch of glass, so that said cup member may receive a gather, means for operating said cup member to deliver the gather, means for receiving the gather, means for inverting said receiving means, said inverting means being timed to the operation of said cup operating means, so that said receiver will invert a gather only after said cup has operated to deliver the gather thereto, said receiver delivering the gather to said mold carrying member when inverted, and interconnected timing mechanisms for said driving means, said cup moving means, and said cup operating means.

29. In a glass gathering mechanism, a gathering cup, means for moving said cup into and out of the glass gathering relation with respect to a batch of molten glass, said cup including pivoted half portions, a cam operating means for said cup, a slide block means cooperating with said cam means for actuation thereby, said cup having a bell crank means pivotally connected to said slide block, so that said cup halves may be closed by said cam means, and a pressure mechanism having a finger cooperating with said slide block for opening said cup halves.

30. In a glass forming apparatus, the combination of a cup carrying member, means for moving said member into and out of a glass gathering relation, an apparatus driving means having suitable cup operating means for opening and closing said cup to discharge a gather of glass therefrom, said means including a rotating cam means for closing said cup, a slide block adapted to cooperate with said cam means for actuation thereby, said slide block being pivotally coupled to said cam for closing said cup, a pressure cylinder having a finger cooperating with said slide block for opening said cup, and mechanism timing the opening of said cup to a given moved position of said cup carrying member.

31. The combination with a glass feeder, of at least one gathering cup, means for moving said cup into and out of gathering relation with respect to a batch of molten glass, shears, means for swinging said shears to and from an operative position, means timing the operation of both of said means, and means simultaneously controlling the position of said shear swinging means and said cup moving means irrespective of said timing means.

32. The combination with a glass feeder, of at least one gathering cup, means for moving said cup into and out of gathering relation with respect to a batch of molten glass, shears, means for swinging said shears to and from an operative position, and a safety valve means for moving said cup out of gathering relation and for moving said shears swinging means from an operative position irrespective of the operative positions of said cup moving means and said shear swinging means.

33. A glass gathering apparatus including a gathering member, means for moving said member into gathering relation with respect to a batch of molten glass, so that said member may receive a gather of glass, shears, means for moving said shears into an operative position for cutting off a thread adhering to the gather of said member, means timing said shear moving means with said member moving means, and additional means for moving said shears out of an operative position irrespective of said timing mechanism.

34. A glass forming apparatus including a mold carrying member, a feeder member operatively coupled thereto and having at least one gathering cup, shears, means for swinging said shears to and from an operative position, means for moving said cup into a gathering relation with respect to a batch of molten glass, and additional means for controlling the position of said shear swinging means and said cup moving means.

35. A glass forming apparatus including a mold carrying member, a feeder member operatively connected thereto, at least one gathering cup associated with said feeder member, driving means for actuating said mold and feeder members, shears, means for swinging said shears to and from an operative position, means for swinging said cup into and out of gathering relation with respect to a batch of molten material, and a safety valve for controlling the position of said shear swinging means and said table moving means.

36. In combination in a glass forming apparatus, a rotatable mold carrying table, a feeder table operatively coupled thereto for rotation therewith, at least one gathering cup carried by said feeder table, means for moving said feeder table into and out of a gathering relation with respect to a batch of molten glass, a timing mechanism controlling the operation of said last mentioned means, and manually operated means for moving said feeder table out of a glass gathering position and thereby changing the normal timing of the apparatus.

37. In combination with a glass forming mechanism, of a cup carrying member, means for moving said cup from a gathering to a delivering station, means for moving said cup into and out of a gathering relation with respect to a batch of molten glass at the gathering station, and mechanism for moving said member out of a gathering relation and rendering both of said means ineffective.

38. In combination with a glass forming mechanism, a movable cup carrying member, means for moving said member, timing mechanism for controlling the operation of said means, and mechanism for moving said member in another direction and rendering said timing mechanism ineffective.

39. In combination with a glass forming mechanism, a rotatable table, at least one gathering cup carried thereby, means for rotating said table, timing mechanism for controlling the operation of said means, and mechanism for raising said table and rendering said timing mechanism ineffective.

40. In combination with a glass forming mechanism, a movable cup member, means for actuating said member, a timing mechanism for controlling the operation of said means, a valvular mechanism cooperatively associated with said timing mechanism and forming a part of the system thereof, and means changing the normal position of said valve for moving said table and thereby upsetting the normal timed relation of said first mentioned moving means.

41. In combination with a glass forming mechanism, a cup member, means for moving said cup member from a charge-receiving position to a charge-delivery position, means for moving said member into and out of gathering relation with respect to a batch of molten material, a mechanism timing said first mentioned operation with said second mentioned operation, and a valvular mechanism for moving said member out of glass gathering position and thereby upsetting the normal timing of said mechanism.

42. In combination with a glass forming mechanism, of a gathering cup, means for moving said cup into and out of gathering relation with respect to a batch of molten glass, timing means for controlling the operation of said moving means, and mechanism for moving said cup out of a gathering relation and rendering said timing means ineffective, and means operated by the movement of said mechanism for resetting said timing mechanism.

43. In combination with a glass forming mechanism, a movable cup member, means for actuating said member for moving it into charge gathering and delivery positions, shears for cutting off a thread of glass adhering to said cup member, said cup member and said actuating means and said shears having a normal timed and operative relation with respect to each other, a mechanism moving said cup member out of the charge gathering position with respect to a batch of glass and moving said shears out of operative position and changing the normal timed relation of said member actuating means and said shears.

44. In combination with a glass forming apparatus, a cup member, means for moving said cup into a gather-receiving relation with respect to a batch of molten glass, shears for severing a thread of glass adhering to the gather in said cup, and valve controlled mechanism for controlling a simultaneous movement of said cup out of glass gathering relation with respect to the glass and movement of said shears to an inoperative position.

45. A glass forming apparatus including a mold carrying member, a feeder member having at least one gathering cup associated therewith, said mold and feeder members being operatively interconnected, means for actuating said members, means for disconnecting said members with respect to each other, said means including a pinion and an associated mounting shaft, said pinion being splined to said shaft, means for moving said pinion out of splined relation with respect to said associated shaft, so that said members will be disconnected and that said mold and feeder members can be again interconnected in the same relation as before.

46. A glass forming apparatus including mold and feeder members, mechanism operatively interconnecting said members, a driving mechanism for said members, and means for disconnecting said members and again connecting said members in the same relation as before, said mechanism including a pinion slidably positioned on a keyed driving shaft and being grooved adjacent one end thereof, so that when said pinion is moved in one direction with respect to said shaft that the key of said shaft will be positioned adjacent the grooved portion of said pinion thereby permitting relative rotation therebetween.

47. In combination in a glass forming apparatus, a carrying member having a suitable mold, means for locking said member in a given position, means for moving said member, means for feeding said mold, and means timed to the operation of said locking means for opening said mold feeding means to deliver a charge therefrom.

48. In combination in a glass forming apparatus, a mold carrying member, means for locking said member in a charge-receiving position, means for moving said member, a feeder member having a cup, said feeder being driven by said mold carrying member, suction means for drawing up a charge of molten glass into said cup, and means timed to the operation of said locking means for opening said cups and delivering mold charges therefrom.

49. In combination in a glass feeding mechanism, a mold carrying table, means for moving said table, means for locking said table in a charge-receiving position, a gathering cup, means controlled by movement of said table for moving said cup into charge gathering and delivery positions, and means timed with the operation of said locking means for actuating said cup and discharging a mold charge carried thereby.

50. In combination in a feeder, a movable gathering cup, driving means moving said cup to gathering and delivery stations, means for moving said cup into and out of contact with the surface of a batch of molten glass at a gathering station, a timing mechanism for said driving means, a timing mechanism for said last-mentioned moving means, and means controlled by said last-mentioned moving means for controlling the operation of said first-mentioned timing mechanism.

51. In combination in a feeder, a movable cup carrying member, means for holding said cup carrying member in a given position, releasing means for said holding means, so that said member may be moved to gathering and delivery positions, means moving said member into and out of gathering relation with respect to a batch of molten glass, a timing mechanism for said moving means, means motivated by said moving means for controlling the operation of said first mentioned timing mechanism, and means motivated by said releasing means for controlling the operation of the timing mechanism of said moving means.

52. In combination in a feeder, a movable gathering member, driving means for moving said member to gathering and delivery positions, means actuating said member and moving it into gathering relation with respect to a batch of molten material at a gathering position, timing mechanism for said driving means, a timing mechanism for said actuating means, means motivated by said actuating means for controlling the operation of said first mentioned timing mechanism, and means motivated by said driving means for controlling the operation of the timing mechanism of said actuating means.

53. The combination with a feeder, of a cup member, actuating means for moving said cup, means holding said member in a locked position, releasing means for unlocking said holding means, so that said member may be moved to gathering and delivery stations by said actuating means, means for moving said member into and out of a gathering relation with respect to a batch of molten material, said releasing means having a timing mechanism, a timing mechanism for said moving means, means actuated by said moving means and controlling the operation of said first mentioned timing mechanism, and means actuated by said releasing means and controlling the operation of the timing mechanism of said moving means.

54. A glass gathering and delivery mechanism including at least one gathering member, means for swinging said member to glass gathering and glass discharging positions, driving means for said swinging means, means for moving said gathering member into and out of a glass gathering relation with respect to a batch of molten glass, timing means controlling a movement of said driving means and being in turn controlled by a movement of said driving means, timing means controlling a movement of said moving means and being in turn controlled by said driving means.

55. A glass gathering and delivering mechanism including at least one gathering cup, means swinging said cup to glass gathering and delivering positions, driving means for said swinging means, means moving said cup into and out of a glass gathering relation with respect to a batch of molten glass, timing mechanism controlling one movement of said driving means and being in turn controlled by said cup moving means, and a timing mechanism controlling a movement of said moving means and being in turn controlled by said driving means.

56. In combination in a feeder, a cup member, driving means for intermittently shifting said cup member, means for locking said cup member against rotation, means for moving said cup member into and out of gathering relation with respect to a batch of molten material, a timing mechanism for said locking means, a timing mechanism for said driving means controlled by said first mentioned timing mechanism, means controlled by said cup moving means for controlling the operation of said first mentioned timing mechanism, and a timing mechanism for said cup member moving means and controlled by said first mentioned timing mechanism.

57. In a glass forming apparatus, a mold carrying table and a feeder table operatively coupled thereto, at least one gathering cup carried by said feeder table and having a plurality of movable parts, driving means for rotating said tables, means for moving said feeder table into and out of a gathering relation with respect to a batch of molten glass, means actuating the parts of said cup for opening it, and interconnected timing mechanism for said driving means, said moving means, and said cup parts actuating means, the timing mechanism for said driving means being controlled in one operation by said table moving means, said timing mechanism for the cup actuating parts being controlled by said timing mechanism of said driving means.

58. In a glass gathering apparatus, a rotatable table, means for intermittently rotating said table, at least one gathering cup carried by said table, means for moving said cup into and out of gathering relation with respect to a batch of molten glass, shears for severing glass depending from said cup after the gathering operation, means for actuating said shears, timing mechanism for controlling the operation of said rotating means, timing mechanism for controlling the operation of said cup moving means, and means actuated by said cup moving means for controlling said first-mentioned timing mechanism.

59. In a glass forming apparatus, a movable cup carrying member, a cup carried by said member, driving means for shifting said member, pressure actuated means for moving said cup out and into gathering relation with a batch of molten glass, means for actuating said cup to deliver a gather, means for receiving and inverting the charge delivered from said cup, timing mechanism for said pressure actuating means and for said cup actuating means, said mechanism being controlled by said driving means, and means actuated by said cup actuated means for controlling the operation of said charge-receiving means.

60. In combination in a glass forming apparatus, a movable cup carrying member, a cup carried by said member, driving means for said member, means for moving said member into and out of gathering relation with respect to a batch of molten glass means for actuating parts of said cup for delivering a gather, timing mechanism for said moving means and said actuating means, said timing mechanism being controlled by said driving means, and means actuated by said cup moving means for controlling the operation of said driving means.

61. In combination in a glass forming apparatus, a movable cup carrying member, a cup carried by said member, means for moving said cup into and out of gathering relation with respect to a batch of molten glass, timing mechanism for said moving means, a driving means for moving said cup to gathering and delivery positions, a timing mechanism for said driving means and said moving means, means for controlling an operation of said last-mentioned timing mechanism, and means actuated by said cup moving means for also controling an operation of said last-mentioned timing mechanism.

62. In a glass gathering apparatus, a cup member, means for supporting said cup member, means for moving said cup member to and from a gathering position with respect to a batch of molten glass, a shear mechanism, means operating in a timed relation with said member moving means for moving said shear mechanism to and from an operative position, a cam driven by said member moving means, a crosshead having a slide mounting and being connected to said shear mechanism, a pivoted lever having one end cooperating with said cam and another end cooperating with said crosshead, so that shear mechanism may be actuated to sever a thread of glass adhering to a charge carried by said cup.

63. The combination with a glass feeding apparatus, of a gathering cup, shears, a pneumatically controlled swinging bracket for swinging said shears to and from an operative position adjacent said cup, and a mechanically controlled and cam actuated crosshead for operating said shears and severing a thread of glass adhering to charge carried by said cup.

64. The combination with a glass feeder, of at least one gathering cup, driving means for moving said cup into gathering relation with a batch of molten glass, shears, a pressure mechanism for swinging said shears to and from an operative position, a cam actuated by said driving means and operating said shears to sever a thread of glass adhering to a charge carried by said cup, means operatively connecting said cam to said shears, said connecting means having a compensating portion, so that said cam and shears are operatively connected even when the shears have been moved from one position to another by said pressure mechanism.

65. In combination in a glass forming apparatus, a movable cup carrying member, means for moving said cup carrying member to glass gathering and delivering positions, shears, pressure actuated means for swinging said shears to and from an operative position, a timing mechanism responsive in operation to movement of said driving means for controlling the delivery of actuating pressure to said shear swinging means, a crosshead, a cam for operating said crosshead, a toggle connecting said crosshead to said shears, said cam being actuated by said timing mechanism for operating said shears and cutting off a thread of the gather extending from said cup.

FRANK O'NEILL.

CERTIFICATE OF CORRECTION.

Patent No. 2,034,055.                                           March 17, 1936.

FRANK O'NEILL.

It is hereby certified that error appears in the printed specification of the above numbered patent requiring correction as follows: Page 5, second column, line 53, for "piston" read pinion; page 11, second column, line 65, claim 30, strike out the words "cam for closing said"; and that the said Letters Patent should be read with these corrections therein that the same may conform to the record of the case in the Patent Office.

Signed and sealed this 5th day of May, A. D. 1936.

(Seal)
                                          Leslie Frazer
                              Acting Commissioner of Patents.